(12) United States Patent
Isomura et al.

(10) Patent No.: US 8,411,968 B2
(45) Date of Patent: Apr. 2, 2013

(54) ALBUM CREATING APPARATUS, METHOD AND PROGRAM THAT CLASSIFY, STORE, AND ARRANGE IMAGES

(75) Inventors: Ayumu Isomura, Tokyo (JP); Yasuyo Nenoki, Tokyo (JP); Akira Yoda, Kanagawa (JP); Kimiko Tachikawa, Tokyo (JP); Shinsuke Zetsu, Tokyo (JP); Yasuhiko Kaneko, Kanagawa (JP); Hideaki Yoshihara, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 1104 days.

(21) Appl. No.: 12/090,621

(22) PCT Filed: Oct. 18, 2006

(86) PCT No.: PCT/JP2006/321193
§ 371 (c)(1),
(2), (4) Date: Jul. 17, 2008

(87) PCT Pub. No.: WO2007/046534
PCT Pub. Date: Apr. 26, 2007

(65) Prior Publication Data
US 2009/0116752 A1    May 7, 2009

(30) Foreign Application Priority Data

Oct. 18, 2005  (JP) ................. 2005-303687
Jan. 20, 2006  (JP) ................. 2006-012274

(51) Int. Cl.
*G06K 9/62*  (2006.01)
(52) U.S. Cl. ........ 382/224; 382/100; 382/190; 382/228; 382/305; 715/200; 715/204; 715/230; 715/234; 715/273

(58) Field of Classification Search .................. None
See application file for complete search history.

(56) References Cited

U.S. PATENT DOCUMENTS 5,796,428 A * 8/1998 Matsumoto et al. ..... 348/207.99
6,198,526 B1 * 3/2001 Ohtsuka .................. 355/40
(Continued)

FOREIGN PATENT DOCUMENTS

JP  2003-259285 A  9/2003
JP  2005-182767 A  7/2005
(Continued)

*Primary Examiner* — Matthew Bella
*Assistant Examiner* — Jason Heidemann
(74) *Attorney, Agent, or Firm* — Birch, Stewart, Kolasch & Birch, LLP

(57) ABSTRACT

An album creating apparatus for crating an album by automatically selecting an appropriate image to be laid out in an image layout frame arranged in a template and laying out the selected image in the image layout frame is provided. The album creating apparatus according to the present invention includes: a classification method storage section for classifying images into groups in association with the kind of album; an image input section; a kind of album determining section for determining the kind of album to be created; an in image classification section for classifying the images into the groups based on the classification method stored in the classification method storage section in association with the kind of album; a template storage section for storing a template in which the image layout frame with which the classified group is associated is arranged; and an album creating section for laying out in an image layout frame the image classified into the group associated with the image layout frame to create the album.

10 Claims, 16 Drawing Sheets

U.S. PATENT DOCUMENTS

| | | | |
|---|---|---|---|
| 6,222,947 B1* | 4/2001 | Koba | 382/284 |
| 6,590,608 B2* | 7/2003 | Matsumoto et al. | 348/231.2 |
| 6,606,411 B1* | 8/2003 | Loui et al. | 382/224 |
| 6,636,648 B2* | 10/2003 | Loui et al. | 382/284 |
| 6,771,801 B1* | 8/2004 | Fisher et al. | 382/112 |
| 7,035,467 B2* | 4/2006 | Nicponski | 382/224 |
| 7,835,580 B2* | 11/2010 | Ono | 382/224 |
| 2003/0072486 A1* | 4/2003 | Loui et al. | 382/175 |
| 2003/0074373 A1* | 4/2003 | Kaburagi et al. | 707/104.1 |
| 2003/0128877 A1* | 7/2003 | Nicponski | 382/224 |
| 2004/0064339 A1* | 4/2004 | Shiota et al. | 705/1 |
| 2004/0201752 A1* | 10/2004 | Parulski et al. | 348/231.99 |
| 2005/0111737 A1* | 5/2005 | Das et al. | 382/190 |
| 2005/0134946 A1* | 6/2005 | Tsue et al. | 358/537 |
| 2005/0141849 A1* | 6/2005 | Tsue et al. | 386/4 |
| 2005/0168779 A1* | 8/2005 | Tsue et al. | 358/1.18 |
| 2006/0056737 A1* | 3/2006 | Ohtsuka et al. | 382/305 |
| 2006/0120618 A1* | 6/2006 | Mizoguchi | 382/255 |
| 2006/0197985 A1* | 9/2006 | Yoda et al. | 358/1.18 |
| 2006/0200758 A1* | 9/2006 | Atkins | 715/517 |
| 2006/0244765 A1* | 11/2006 | Isomura et al. | 345/635 |
| 2006/0279555 A1* | 12/2006 | Ono | 345/173 |
| 2006/0279566 A1* | 12/2006 | Atkins et al. | 345/418 |

FOREIGN PATENT DOCUMENTS

| | | |
|---|---|---|
| JP | 2005-190401 A | 7/2005 |
| JP | 2005-210689 A | 8/2005 |
| WO | WO-2004/055696 A2 | 7/2004 |

* cited by examiner

120

| KIND OF ALBUM | CLASSIFICATION METHOD | | | |
|---|---|---|---|---|
| | INDEX 1 | INDEX 2 | INDEX 3 | |
| TRAVEL | IMAGE CAPTURING PLACE | IMAGE CAPTURING TIME AND DATE | PERSON | ...... |
| WEDDING PARTY | PERSON | NUMBER OF PERSONS | IMAGE CAPTURING TIME | ...... |
| GROWTH RECORD | PERSON | IMAGE CAPTURING TIME AND DATE | IMAGE CAPTURING PLACE | ...... |
| ...... | ...... | ...... | ...... | ...... |

FIG. 5

| IMAGE LAYOUT FRAME | MAIN IMAGE COMPOSITE INFORMATION |
|---|---|
| 1702 | • CONDITION OF MAIN IMAGE a<br>• CONDITION OF MAIN IMAGE b<br>⋮ |
| 1704 | • CONDITION OF MAIN IMAGE f<br>⋮ |
| ⋮ | ⋮ |

*FIG. 15*

| IMAGE LAYOUT FRAME | SUB-IMAGE COMPOSITE INFORMATION |
|---|---|
| 1702 | • CONDITION OF SUB-IMAGE a<br>• CONDITION OF SUB-IMAGE b<br>⋮ |
| ⋮ | ⋮ |

*FIG. 16*

ALBUM CREATING APPARATUS, METHOD AND PROGRAM THAT CLASSIFY, STORE, AND ARRANGE IMAGES

TECHNICAL FIELD

The present invention relates to an album creating apparatus, an album creating method, and an album creating program. Particularly, the present invention relates to an album creating apparatus, an album creating method and an album creating program for creating an album in which a plurality of images are laid out. The present application relates to and claims priority from Japanese Patent Applications No. 2005-303687 filed in Japan on Oct. 18, 2005 and No. 2006-012274 filed in Japan on Jan. 20, 2006, the contents of which are incorporated herein by reference for all purpose if applicable in the designated state.

BACKGROUND ART

An image editing apparatus for selecting an image to be laid out in a designated layout image frame according to information has been disclosed as, for example, in Japanese Patent Application Publication No. 2005-210689. In the image editing apparatus, information for designating an image to be laid out in the image layout frame is provided to each image layout frame into which the image included in a template of the album should be laid out, and the operator designates the image layout frame in the template, so that the image to be laid out in the designated image layout frame can be selected according to the information.

DISCLOSURE OF THE INVENTION

Problems to be Solved by the Invention

However, in the above-described conventional art, the information for designating the image to be laid out in the image layout frame is selected based on the number of persons in the image, the orientation of the person and whether the eyes of the person are opened. Accordingly, an image unrelated to the type of album which is desired by a user may be sometimes selected as the image to be laid out in the image layout frame. Additionally, when an image to be laid out in the image layout frame is selected, it sometimes takes a long time to select the image because it is necessary to determine whether all of a number of images are matched with a predetermined information. Therefore, the album can not be speedily created.

Thus, the object of the present invention to provide an album creating apparatus, an album creating method and an album creating program which are capable of solving the problem accompanying the conventional art. The above and other advantages can be achieved by combining the features recited in independent claims. Then, dependent claims define further effective specific example of the present invention.
Means for Solving the Problems In order to solve the above described problems, a first aspect of the present invention provides an album creating apparatus for creating an album in which a plurality of images are laid out. The album creating apparatus includes: a classification method storage section for storing a classification method of classifying images into a plurality of groups in association with a kind of album; an image input section for inputting the images; a kind of album determining section for determining the kind of album created by using the images inputted by the image input section; an image classification section for classifying the images inputted by the image input section into a plurality of groups in association with the kind of album determined by a kind of album determining section based on the classification method stored in the classification method storage section; a template storage section for storing a template in which image layout frames with which the groups into which the images are classified by the image classification section are classified are arranged; and an album creating section for laying out in an image layout frame arranged in the template stored in the template storage section the image classified into the group associated with the image layout frame.

The classification method storage section may store a plurality of classification methods of which indexes for classifying are different each other. The image classification section may classify the images inputted by the image input section into a plurality of groups based on each of the plurality of classification methods stored in the classification method storage section in association with the kind of album determined by the kind of album determining section. The template storage section may store the template in which the image layout frame associated with the plurality of groups of which classification indexes are different from each other. The album creating section may create an album by laying out in image layout frames arranged in the template stored in the template storage section the images classified into the plurality of groups of which classification indexes are different from each other associated with the image layout frames. Then, the template storage section may store a template which previously defines that the image classified into a second group should be laid out in a second image layout frame when the image classified into a first group is laid out in a first image layout frame, and that the image classified into a fourth group should be laid out in the second image layout frame when the image classified into a third group is laid out in the first image layout frame. The album creating section may create an album by laying out the image classified into the second group in the second image layout frame when the image classified into the first group is laid out in the first image layout frame of the template stored in the template storage section, and by laying out the image classified into the fourth group is laid out in the second image layout frame when the image classified into the third group is laid out in the first image layout frame of the template stored in the template storage section.

The album creating apparatus may further include an edit instruction notifying diction for notifying a user of an instruction that the image classified into the group associated with an image layout frame should be laid out in the image layout frame arranged in the template stored in the template storage section. The album creating section may create an album by laying out the image selected by the user according to the instruction notified by the edit instruction notifying section in the image layout frame. The template storage section may store a template which previously defines that the image classified into the second group should be laid out in the second image layout frame when the image classified into the first group is laid out in the first image layout frame, and that the image classified into the fourth group should be laid out in the second image layout frame when the image classified into the third group is laid out in the first image frame. The edit instruction notifying section may notify the user of instruction that the image classified into the second group should be laid out in the second image layout frame when the image classified into the first group is laid out in the first image layout frame of the template stored in the template storage section and that the image classified into the fourth group should be laid out in the second image layout frame when the image classified into the third group is laid out in the first image layout frame.

The classification method storage section may store a classification method of classifying images based on at least an index being an image capturing place in association with the kind of album such as a travel album. Additionally, the classification method storage section may store a classification method of classifying images based on at least an index being the kind of subject in association with the kind of album such as an wedding album. Further, the classification method storage section may store classification method of classifying images based on at least an index being an image capturing time in association with the kind of album such as a growth record album.

A second aspect of the present invention provides an album creating method for creating an album in which a plurality of images are laid out. The album creating method includes the steps of: storing a classification method of classifying images into a plurality of groups in association with a kind of album in a classification method storage section, inputting the images from an image input section; determining the kind of album created by using the images inputted by the image input section; classifying the images inputted by the image input section into a plurality of groups based on the classification method stored in the classification method storage section in association with the kind of album determined in a kind of album determining step; storing in a template storage section a template in which the image layout frame with which the group into which the images are classified by the image classification step are arranged; laying out in an image layout frame arranged in the template stored in the template storage section the image classified into the group associated with the image layout frame to create an album.

A third aspect of the present invention provides an album creating program for an album creating apparatus for creating an album in which a plurality of images are laid out. The album creating program causes the album creating apparatus to function as: a classification method storage section for storing a classification method of classifying images into a plurality of groups in association with a kind of album; an image input section for inputting the images; a kind of album determining section for determining the kind of album created by using the images inputted by the image input section; an image classification section for classifying the images inputted by the image input section into a plurality of groups in association with the kind of album determined by a kind of album determining section based on the classification method stored in the classification method storage section; a template storage section for storing a template in which image layout frames with which the groups into which the images are classified by the image classification section are classified are arranged; and an album creating section for laying out in an image layout frame arranged in the template stored in the template storage section the image classified into the group associated with the image layout frame.

A fourth aspect of the present invention provides an album creating apparatus. The album creating apparatus includes: an image input section for inputting images; a specified subject information acquiring section for acquiring specified subject information which specifies a subject included in the image; a specified subject image extracting section for extracting a first specified image including a specified subject which is specified by the specified subject information acquired by the specified subject information acquiring section among the images inputted by the image input section; a template storage section for storing a template which previously defines composite information indicating that a first specified subject image should be laid out in a first image layout frame; and an album creating section for laying out the first specified subject image extracted by the specified subject image extracting section in the first image layout frame based on the composite information previously defined in the template which stored in the template storage section to create the album. The album creating apparatus further includes a character information arrangement section for arranging character information in the first image layout frame. The template storage section may modify the character information stored in the template storage section in association with the first image layout frame according to the specified subject information acquired by the specified subject information acquiring section and arrange the same in the first image layout frame when the album creating section lays out the first specified subject image in the first image layout frame.

The specified subject information acquiring section may acquire specified subject information including character information indicative of the characteristic of the specified subject. The character information arrangement section may modify at least a part of character information stored in the template storage section in association with the first image layout frame to the character information indicative of the characteristic of the specified subject included in the specified subject information acquired by the specified subject information acquiring section and arrange the same in the first image layout frame. The album creating apparatus further includes a trimming section for trimming the specified subject included in the specified subject image to generate a trimming image. The specified subject image extracting section may extract a second specified subject image including the specified subject being a subject which is captured within a predetermined period from the time at which the extracted first specified subject image was captured and which is specified by the specified subject information acquired by the specified subject information acquiring section. The trimming section may trim each of the first specified subject image and the second specified subject image to generate a first trimming image and a second trimming image, of which occupied area ratio to the specified subject image are different from each other, respectively. The album creating section may create the album by laying out the first trimming image and the second trimming image generated by the trimming section in the first image layout frame and the second image layout frame, respectively.

A fifth aspect of the present invention provides an album creating method. The album creating method further includes the steps of: inputting a plurality of images; selecting a main image frame in which the main image is laid out among the plurality of image layout frames; selecting the main image to be laid out in the main image frame among the plurality of images inputted by the image input step based on the composite information stored in the main image composite information storage section in association with the main image frame selected by the main image frame selecting step; determining the condition of the sub-image indicated by the composite information for the sub-image stored in the sub-image composite information storage section in association with the sub-image frame being an image layout frame other than the main image frame based on the content of the main image selected by the main image selecting step; selecting the sub-image to be laid out in the sub-image frame among the plurality of images inputted by the image input step based on the condition of the sub-image determined for each sub-image by the sub-image composite information determining step; and laying out the first specified subject image extracted by the specified subject image extracting section in the first image layout frame based on the composite information previously defined in the template which stored in the template storage section to create the album.

A sixth aspect of the present invention provides an album creating program for an album creating apparatus for creating an album. The album creating program causes the album creating apparatus to function as: an image input section for inputting images; a specified subject information acquiring section for acquiring specified subject information which specifies a subject included in the image; a specified subject image extracting section for extracting a first specified subject including a specified subject which is specified by the specified subject information acquired by the specified subject information acquiring section among the images inputted by the image input section; a template storage section for storing a template which previously defines composite information indicating that a first specified subject image should be in a first image layout frame; and an album creating section for laying out the first specified subject image extracted by the specified subject image extracting section in the first image layout frame to create the album.

A seventh aspect of the present invention provides an album creating apparatus. The album creating apparatus includes: a main image composite information storage section for storing composite information for a main image indicative of the condition of the main image to be laid out in an image layout frame in association with each of a plurality of image layout frames; and a sub-image composite information storage section for storing composite information for a sub-image indicative of the condition of a sub-image to be laid out in an image layout frame in association with each of a plurality of image layout frames, which is determined dependent on the content of the main image laid out in the other image layout frame. Additionally, the album creating apparatus may further include: an image input section for inputting a plurality of images; a main image frame selecting section for selecting a main image frame in which the main image is laid out among the plurality of image layout frames; a main image selecting section for selecting the main image to be laid out in the main image frame among the plurality of images inputted by the image input section based on the composite information stored in the main image composite information storage section in association with the main image frame selected by the main image frame selecting section; a sub-image composite information determining section for determining for each sub-image frame the condition of the sub-image indicated by the composite information for the sub-image stored in the sub-image composite information storage section in association with the sub-image frame being an image layout frame other than the main image frame based on the content of the main image selected by the main image selecting section; a sub-image selecting section for selecting the sub-image to be laid out in the sub-image frame among the plurality of images inputted by the image input section based on the condition of the sub-image determined for each sub-image by the sub-image composite information determining section; and an album creating section for laying out the main image selected by the main image selecting section in the main image frame, and the sub-image selected by the sub-image selecting section in the sub-image frame, respectively to create the album.

The album creating apparatus may further include a condition comparison section for comparing a plurality of images inputted by the image input section with each of the conditions for the main image indicated by the composite information for the main image stored in the main image composite information storage section in association with each of the plurality of image layout frames. The main image selecting section may select the image of which content is most matched with the condition of the main image associated with a plurality of image layout frames as the main image frame based on the comparison result by the condition comparison section. The main image frame selecting section may select the image layout frame with which the condition of the main image is associated is most matched with the content of the image as the main image frame in which the main image is laid out based on the comparison result by the condition comparison section. The sub-image composite information determining section determines, for each sub-image frame, the condition of the sub-image indicated by the composite information for the sub-image stored in the sub-image composite information storage section in association with the sub-image frame being an image layout frame other than the main image frame based on the content of the main image selected by the main image selecting section. The sub-image selecting section may select the image of which content is most matched with the condition of the sub-image determined for each sub-image frame by the sub-image composite information determining section as a sub-image to be laid out in the sub-image frame.

The album creating apparatus may further include a main image composite information weight storage section for storing the weight of the condition of the main image in association with each of the conditions of the main image indicated by the composite information for the main image stored in the main image composite information storage section. The main image selecting section may select the image which is matched with the condition of the main image of which weight is largest stored in the main image composite information weight storage section in association with the condition of the main image of which content is matched with the condition of the main image. The main image frame selecting section may select the image layout frame in which the main image selected by the main image selecting section is laid out as the main image frame. Additionally, the album creating apparatus may further include the sub-image composite information weight storage section for storing an weight of the condition of the sub-image in association with each of the conditions of the sub-image indicated by the composite information for the sub-image stored in the sub-image composite information storage section. The sub-image selecting section may select the image which is matched with the condition of the sub-image of which weight is largest stored in the sub-image composite information weight storage section in association with the condition of the sub-image determined for each of the sub-image frames by the sub-image frame composite information determining section as the sub-image to be laid out in the sub-image frame other than the main image frame selected by the main image frame selecting section.

Additionally, the album creating apparatus may further include a main image composite information weight storage section for storing an weight of the condition for the main image in association with each of the conditions of the main image indicated by the composite information for the main image stored in the main image composite information storage section. The main image selecting section may calculate the total value of the weights of the conditions of the main image stored in the main image composite information weight storage section in association with each of the plurality of images inputted by the image input section, each of which contents is matched with the condition of the main image in the image layout frame, and select the image of which calculated total value of weight is largest as the main image. The main image frame selecting section may select the image layout frame in which the main image selected by the main image selecting section is laid out as the main image frame. Additionally, the album creating apparatus may further include a sub-image composite information weight storage section for storing an weight of the condition of the sub-image in association with each of the conditions of the sub-image indicated by the composite information for the sub-image stored in the sub-image composite information storage section. The sub-image selecting section calculates the total value of the weight of the conditions of the sub-image stored in the sub-image composite information weight storage section in association with each of the plurality of images inputted by the image input section, each of which contents is matched with the condition of the sub-image in the image layout frame, and select the image of which calculated total value of weight is largest as the sub-image to be laid out in the sub-image frame other than the main image frame selected by the main image frame selecting section.

The album creating apparatus may further include a layout matching calculating section for calculating for each layout the degree of matching of a layout when each of the plurality of image layout frames is as a main image frame based on the degree of matching between the content of the main image selected by the main image selecting section and the condition of the main image stored in the main image composite information storage section in association with the main image frame selected by the main image frame selecting section and the degree of matching between the content of the sub-image selected by the sub-image selecting section and the condition of the sub-image stored in the sub-image composite information storage section in association with the sub-image frame in which the sub-image is laid out. The album creating section may create an album that each layout calculated by the layout matching calculating section is most matched each other. Additionally, the album creating apparatus may further include a main image composite information weight storage section for storing an weight of the condition of the main image in association with the each of the conditions of the main image stored in the main image composite information storage section, and a sub-image composite information weight storage section for storing an weight of the condition of the sub-image in association with the each of the conditions of the sub-image stored in the sub-image composite information storage section. The layout matching calculating section may sum the weights of the conditions of the main image stored in the main image composite information storage section in association with the condition of the main image in the main image frame is matched with the content of the main image selected by the main image selecting section and the weight of the condition of the sub-image stored in the sub-image composite information storage section in association with the condition of the sub-image in the sub-image frame is matched with the content of the sub-image selected by the sub-image selecting section and calculate for each layout the weight of the layout when each of the plurality of image layout frames is as the main image frame. The album creating section may create an album that the weight of the layout calculated by the layout matching section is largest.

An eighth aspect of the present invention provides an album creating method. The album creating method includes the steps of: storing composite information for a main image indicative of the condition of the main image to be laid out in an image layout frame in a main image composite information storage section in association with each of a plurality of image layout frames; and storing composite information for a sub-image indicative of the condition of a sub-image to be laid out in an image layout frame in a sub-image composite information storage section in association with each of a plurality of image layout frames, which is determined dependent on the content of the main image laid out in the other image layout frame. Additionally, the album creating method further includes: inputting a plurality of images: selecting a main image frame in which the main image is laid out among the plurality of image layout frames; selecting a main image to be laid out in the main image frame among the plurality of images inputted by the image input section in association with the main image frame selected by the main image frame selecting section based on the composite information for the main image stored in the main image composite information storage section; determining for each sub-image frame the condition of the sub-image indicated by the composite information for the sub-image stored in the sub-image composite information storage section in association with the sub-image frame being an image layout frame other than the main image frame based on the content of the main image selected by the main image selecting section; selecting a sub-image to be laid out in the sub-image frame among the plurality of images inputted by the image input section based on the condition of the sub-image determined for each sub-image frame by the sub-image composite information determining section; and laying out the main image selected by the main image selecting step in the main image frame, and the sub-image selected by the sub-image selecting step in the sub-image frame, respectively to create the album.

A ninth aspect of the present invention provides an album creating program for an album creating apparatus for creating an album. The album creating program causes the album creating apparatus to function as: a main image composite information storage section for storing composite information for a main image indicative of the condition of the main image to be laid out in an image layout frame in association with each of a plurality of image layout frames; and a sub-image composite information storage section for storing composite information for a sub-image indicative of the condition of a sub-image to be laid out in an image layout frame in association with each of a plurality of image layout frames, which is determined dependent on the content of the main image laid out in the other image layout frame. Additionally, the album creating program may further cause to the album creating apparatus to function as: a main image frame selecting section for selecting a main image frame in which the main image is laid out among the plurality of image layout frames; a main image selecting section for selecting the main image to be laid out in the main image frame among the plurality of images inputted by the image input section based on the composite information stored in the main image composite information storage section in association with the main image frame selected by the main image frame selecting section; a sub-image composite information determining section for determining for each sub-image frame the condition of the sub-image indicated by the composite information for the sub-image stored in the sub-image composite information storage section in association with the sub-image frame being an image layout frame other than the main image frame based on the content of the main image selected by the main image selecting section; a sub-image selecting section for selecting the sub-image to be laid out in the sub-image frame among the plurality of images inputted by the image input section based on the condition of the sub-image determined for each sub-image by the sub-image composite information determining section; and an album creating section for laying out the main image selected by the main image selecting section in the main image frame, and the sub-image selected by the sub-image selecting section in the sub-image frame, respectively to create the album.

Here, all necessary features of the present invention are not listed in the summary of the invention. The sub-combinations of the features may become the invention.

Effect of the Invention

According to the present invention, the album creating apparatus classifies a plurality of images into a plurality of groups in association with the kind of album. Then, an appropriate image to be laid out in the image layout frame is automatically selected among the groups associated with the image layout frames, so that the user can easily and speedily lay out the image appropriate for the kind of album in the image layout frame.

BRIEF DESCRIPTION OF THE DRAWINGS

FIG. 5 shows a classification method storage section 120;

FIG. 15 is a schematic diagram showing a main image composite information storage section 142;

FIG. 16 is a schematic diagram showing a sub-image composite information storage section 144;

BEST MODE FOR CARRYING OUT THE INVENTION

Hereinafter, the present invention will now be described through preferred embodiments. The embodiments do not limit the invention according to claims and all combinations of the features described in the embodiments are not necessarily essential to means for solving the problems of the invention.

Figure 1:
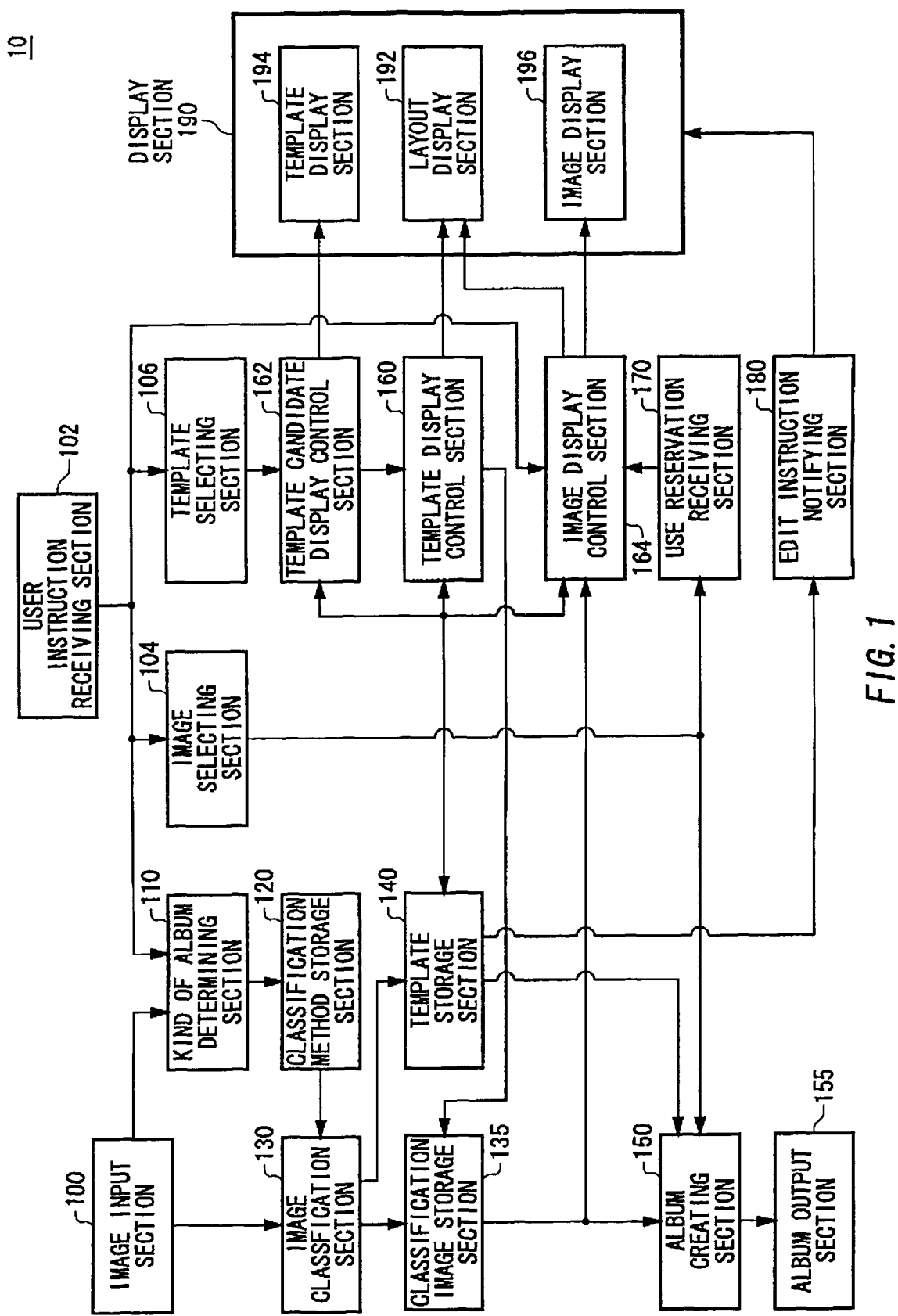
FIG. 1 is a block diagram showing the functional configuration of an album creating apparatus 10.

FIG. 1 shows an example of the functional configuration of an album creating apparatus 10 according to an embodiment of the present invention. The album creating apparatus 10 includes an image input section 100, a user instruction receiving section 102, an image selecting section 104, a template selecting section 106, a kind of album determining section 110, a classification method storage section 120, an image classification section 130, a classification image storage section 135, a template storage section 140, an album creating section 150, an album output section 155, a template display control section 160, a template candidate display control section 162, an image display control section 164, a use reservation receiving section 170, an edit instruction notifying section 180 and a display section 190. The display section 190 includes a layout display section 192, a template display section 194 and an image display section 196. The album creating apparatus 10 according to the present embodiment classifies a plurality of images into a plurality of groups based on the kind of groups. The object of the album creating apparatus 10 according to the present embodiment is to easily and speedily lay out images appropriate for the kind of album desired by the user in pages of the album by selecting an image appropriate to create the album among the images classified in the groups associated with the image layout frames arranged in a template of the album.

The image input section 100 inputs images from the outside of the album creating apparatus 10. The image input section 100 inputs the images through a memory and a network such as Internet. Here, image information such as an image capturing place, an image capturing time and date, and the focal distance may be added to each of the plurality of images. Additionally, the image inputted in the image input section 100 may be the original image of the captured image and an image obtained by performing a predetermined image processing on the original image. The image input section 100 provides the inputted image to the kind of album determining section 110 and the image classification section 130. The user instruction receiving section 102 receives a predetermined instruction from a user. For example, when the user selects the kind of album, the user instruction receiving section 102 provides information for identifying the kind of album selected by the user to the kind of album determining section 110. Additionally, when the user selects a desired template of the album, the user instruction receiving section 102 provides information for identifying the template selected by the user to the template selecting section 106. Further, when the user selects an image to be laid out in the image layout frame arranged in the template of the album, the user instruction receiving section 102 provides information for identifying the image selected by the user to the image selecting section 104.

The image selecting section 104 provides to the album creating section 150 information indicating that the user selects an image to be laid out in the image layout frame arranged in the template of the album, which is received from the user. Additionally, when the user selects an image desired to be laid out in a page other than the page currently laid out by the user in the album, the image selecting section 104 provides information for identifying the desired image to the use reservation receiving section 170. The template selecting section 106 provides information for identifying the template designated by the user to the template candidate display control section 162.

The kind of album determining section 110 determines a kind of album to be created using the images inputted by the image input section 100. Specifically, the kind of album determining section 110 analyzes a plurality of images received from the image input section 100 to determine the kind of album. For example, the kind of album determining section 110 analyzes such as lightness, saturation and the special frequency distribution of the plurality of images to determine the taste such as urban and traditional of album. Additionally, the kind of album determining section 110 may determine the kind of album based on: lightness, saturation and the special frequency distribution; image information such as the image capturing place and the image capturing time and date added to each of the plurality of images and the kind of subject and the number of subjects included in the image.

For, example, the kind of album determining section 110 may determine the kind of album as a travel album based on the image capturing time and date, the image capturing area, the distribution of the image capturing areas and the kind of subject included in the captured images. Additionally, the kind of album determining section 110 may determine the kind of album as an wedding album based on the image capturing time and date, the image capturing area, the distribution of the image capturing areas, the kind of subject included in the captured image and the number of subjects. Further, the kind of album determining section 110 may determine the kind of album as a growth record album based on the image capturing date, the image capturing time, the person included in the captured image, the appearance frequency of the person included in the captured image and the image capturing place. Here, the kind of album determining section 110 may determine the kind of album based on the information received from the user instruction receiving section 102. For example, when the user designates the kind such as taste, theme and the designer of the desired album through the user instruction receiving section 102, the kind of album determining section 110 determines the kind of album which is designated by the user as the kind of album to be created. The kind of album determining section 110 provides the determined kind of album to the classification method storage section 120.

The classification method storage section 120 stores the classification methods to classify images into a plurality of groups in association with the kind of album. For example, the classification method storage section 120 stores the classification method of classifying images based on an index being the image capturing place in association with a travel album. Additionally, the classification method storage section 120 stores the classification method of classifying images based an index being at least the kind of subject in association with an wedding album. Further, the classification method storage section 120 stores the classification method of classifying images based an index being at least an image capturing time in association with a growth record album. Here, the classification method storage section 120 may store a plurality of classification methods in association with one of the kinds of album. For example, the classification method storage section 120 may store the classification method of classifying images based on indexes being the image capturing place, the image capturing time and date, and the person included in the image. The classification method storage section 120 may store the classification method of classifying images based on an index being the light source used for capturing the image. Further, the classification method storage section 120 may store the classification method of classifying images based on indexes being the color and the shape of clothes put on the person. Then, the classification method storage section 120 may store the classification method of classifying images based on an index being texture of the image. Here, the texture may be information indicative of the characteristic structure of the image. Specifically, the texture may be information indicative of the structural lines of the subject and the background included in the image. For example, when a street of office buildings is included in the image, the classification method storage section may classify the image using the texture of buildings. Additionally, the classification method storage section 120 may classify the image based on the texture of the horizon, such as a curtain included in the image and the texture of such as a pavement and a steel tower included in the image, respectively. The classification method storage section 120 provides the classification method corresponding to the kind of album received from the kind of album determining section 110 and the kind of album to the image classification section 130.

The image classification section 130 classifies, in association with the kind of album determined by the kind of album determining section 110, the images inputted by the image input section into a plurality of groups based the classification method stored in the classification method storage section 120. Specifically, the image classification method 130 classifies a plurality of images into a plurality of groups based on image information such as an image capturing time and date, and an image capturing place, and indexes such as the kind of subject included in the image, the image including the person designated by the user, the image not including the person designated by the user, the number of persons included in the image, the appearance frequency of the person included in the image, the degree of closeness among a plurality of persons included in the image, the resolution of the image and the orientation of the image such as a longitudinal direction and a lateral direction. For example, when the kind of album is a travel album, the image classification section 130 classifies the plurality of images based on the index received from the classification method storage section 120. Specifically, the image classification section 130 receives an index being the image capturing place from the classification method storage section 120, analyzes information on the image capturing place added to a plurality of images received from the image input section 100 and classifies the plurality of images into a plurality of groups for each of the image capturing places.

Additionally, the image classification section 130 may classify, in association with the kind of album determined by the kind of album determining section 110, the images inputted by the image input section 100 into a plurality of groups based on each of the plurality of classification methods stored in the classification method storage section 120. For example, when the kind of album is a travel album, the image classification section 130 may classify the plurality of images based on the image capturing place, the image capturing time and date, or the person included in the image. Specifically, the image classification section 130 classifies the plurality of images into groups for each of the image capturing places. Additionally, the image classification section 130 classifies the plurality of images into groups for each of the image capturing time and dates. Further, the image classification section 130 classifies the plurality of images into groups for each of the persons included in the image. For example, the kind of album is a growth record album, the image classification section 130 may classify a plurality of images into groups based on the person included in the image, the image capturing time and date, the image capturing place or the number of captured persons. Specifically, the image classification section 130v classifies a plurality of images into the groups for each of the image capturing time and dates. Additionally, the image classification section 130 classifies the images into the groups for each of the image capturing places. Further, the image classification section 130 classifies the images into each of the number of captured persons. The image classification section 130 provides the classified images to the classification image storage section 135. Additionally, the image classification section 130 provides the kind of album to the template storage section 140.

The classification image storage section 135 stores the images in association with the group identifiers to uniquely identify the groups classified by the image classification section 130. For example, when the kind of album is a travel album, the image classification section 130 stores, in association with the group identifier to uniquely identify each group, the group for each of the classifications, such as the group classified for each image capturing place, the group classified for each image capturing time and dates and the group classified for each person included in the image. The classification image storage section 135 provides the images classified into the groups based on the instruction from the album creating section 150 to the album creating section 150. Additionally, the classification image storage section 135 provides the image for each of the groups to the image display control section 164.

The template storage section 140 stores a template in which the layout frames with which at least one group included in a plurality of groups into which the images are classified by the image classification section 130 are arranged. The template storage section 140 may store a template in which the image layout frames associated with a plurality of groups into which images are classified based on the different indexes are arranged. Additionally, the template storage section 140 may store a plurality of templates in units of a predetermined image layout areas in the album. Here, a unit of image layout area may be a facing page and a page of the album.

Further, the template storage section 140 may store a template in which a main image frame and a sub-image frame are arranged. The main image frame is a frame in which a main image should be arranged in the album. The sub-image frame is a frame in which an image dependent on the main image should be arranged on the image. Here, the main image according to the present embodiment is an image intended to most impress on the user in the page. For example, the main image may be an image most enhanced among the plurality of images laid out in the page. Specifically, the main image may be an image which is larger than the other images, which is laid out more front than the other image and which is laid out at more center than the other image. Additionally, the main image may be an image framed to be enhanced and an image in which a visual effect is applied to the subject. Meanwhile, the sub-image according to the present embodiment may be an image which is smaller than the main image and which is laid out other than the center.

The template storage section 140 may store a template which previously defines that the image classified into a second group should be laid out in a second image layout frame when the image classified into a first group is laid out in a first image layout frame, and that the image classified into a fourth group should be laid out in the second image layout frame when the image classified into a third group is laid out in the first image layout frame. For example, plurality of image layout frames are arranged in the template of a predetermined page in a predetermined kind of album. In this case, the group of images to be laid out is associated with one image layout frame included in the template. Then, at least an image layout frame other than the one image layout frame is associated with a group of images having a specified relationship with the group associated with the one image layout frame.

For example, four image layout frames are arranged in a template. Here, one image frame is larger than the other three image layout frames. In this case, the group of images including a person being the main character of the album may be associated with the image layout frame having the maximum size, and the group of images including persons having a close relationship with the main character such as a lover, families and friends may be associated with the other three image layout frames. Additionally, the group of images including the main character of the person and a plurality of persons may be associated with the image layout frame having the maximum size, and the group of images not including the main character may be associated with the other three image layout frames, respectively.

Here, the association between image layout frames is not limited to as described above. For example, when a plurality of image layout frames are arranged in a template, the group of images having higher resolution is associated with a predetermined one image layout frame, and the group of images having lower resolution is associated with the other image layout frames. Additionally, when the group of images is associated with one image layout frame among a plurality of image layout frames arranged in the template based on the orientation of the main image, the group of sub-images which are directed to a predetermined direction corresponding to the orientation of the main image may be associated with the other image frames. Further, when the group of images on which a predetermined one person is shown is associated with one image layout frame, the group of images on which the person is not shown may be associated with the plurality of other images. Then, the frame layout distance between each image may be associated with the image layout frames arranged in the template based on the image capturing time and date, the image capturing place, the kind of subject included in the image, the number of subjects included in the image, the vanishing point of the image, the motion of the subject included in the image and the degree of closeness between the persons included in the image.

The template storage section 140 provides the template for each page of the album to the album creating section 150. Additionally, the template storage section 140 provides the template of the album to the template display control section 160. Further, receiving information indicating that the template designated by the user is used through the template candidate display control section 162, the template storage section 140 provides the template corresponding to the information to the album creating section 150. Then, when the template used for the album is designated by the user, the template storage section 140 provides an instruction that the images classified into the images associated with an image layout frame should be laid out in the image layout frames arranged in the template stored in the template storage section 140 to the edit instruction notifying section 180.

The edit instruction notifying section 180 notifies the user of an instruction that the images classified into the group associated with the image layout frame should be laid out in the image layout frames arranged in the template stored in the template storage section 140. Specifically, when the template for the page included in a predetermined kind of album is selected, the template storage section 140' provides to the edit instruction notifying section 180 an instruction that the image classified into the group associated with at least one image layout frame arranged in the template should be laid out in the image layout frame. Additionally, when the image classified into the first group is laid out in the first image layout frame of the template stored in the template storage section 140, the edit instruction notifying section 180 may notify the user of the instruction that the image classified into the second group is laid out in the second image layout frame. Further, when the image classified into the third group is laid out in the first image layout frame of the template stored in the template storage section 140, the edit instruction notifying section 180 may notify the user of the instruction that the image classified into the fourth group should be laid out in the second image layout frame. Receiving the instruction, the edit instruction notifying section 180 provides information about the instruction to the display section 190.

The display section 190 displays images, album templates and layouts of the album. Specifically, the display section 190 includes the layout display section 192, the template display section 194 and the image display section 196. The layout display section 192 lays out layouts of the album Then, the template display section 194 displays a template for the album. The template display section 194 displays a plurality of templates for the album. The image display section 196 displays a candidate image to be laid out in the image layout frame arranged in the template. Receiving information indicating that the image classified into the group associated with at least one image layout frame should be laid out in the image layout frame from the edit instruction notifying section 180, the display section 190 displays the received information.

The album creating section 150 creates the album by laying out the image included in the group associated with the image layout frame in the image layout frame arranged in the template stored in the template 140. The album creating section 150 may create the album by laying out the images classified into a plurality of groups based on the different indexes, which are associated with the image layout frames in the image layout frame arranged in the template stored in the template storage section 140. Additionally, when the image classified into the first group is laid out in the first image layout frame of the template stored in the template storage section 140, the album creating section 150 lays out the image classified into the second group in the second image layout frame. Additionally, when the image classified into the third group is laid out in the first image layout frame of the template stored in the template storage section 140, the album creating section 150 lays out the image classified into the fourth group in the second image layout frame.

The album creating section 150 may create the album by laying out the image selected by the user according to the instruction notified by the edit instruction notifying section 180 in the image layout frame. Specifically, based on the instruction provided from the user to the image selecting section 104 through the user instruction receiving section 102, the album crating section 150 may create the album by extracting the image corresponding to the instruction from the classification image storage section 135 and laying out the extracted image in a predetermined image layout frame arranged in the template. The album creating section 150 provides the created album to the album output section 155.

The album output section 155 outputs the album received from the album creating section 150. For example, the album output section 155 outputs the album by printing the facing page in which images are laid out in the image layout frame of the album to a paper medium. Additionally, the album output section 155 may output the album by recording the album on a recording medium such as a DVD. Further, the album creating section 155 may send the album to a terminal such as a user's PC through a network such as LAN, WAN and Internet.

The template display control section 160 causes the display section 190 to display the template stored in the template storage section 140. The template display control section 160 causes the display section 190 to display, for each of the predetermined image layout region of the album, the template selected by the user among a plurality of templates stored in the template storage section 140. Specifically, the template display control section 160 causes the layout display section 192 included in the display section 190 to display the template received from the template storage section 140.

The template candidate display control section 162 arranges a plurality of templates stored in the template storage section 140 and causes the display section 192 to display the same. Specifically, the template candidate display control section 162 arranges the plurality of templates in the template display section 194 and displays the same. Then, the template display control section 160 may display the template selected by the user among the plurality of templates displayed by the template candidate display control section 162. For example, the user selects a desired template among the plurality of templates displayed on the template display section 194 by the template candidate display control section 162. Information for identifying the template selected by the user is provided to the template candidate display control section 162 through the user instruction receiving section 102 and the template selecting section 106. Then, the template candidate display control section 162 provides the template corresponding to the information to the template display control section 160. Next, the template display control section 160 causes the layout display section 192 to display the received template. Additionally, the template display control section 160 provides information for identifying the template selected by the user to the template storage section 140.

The template candidate display control section 162 may change a display screen on which the template selected by the user is displayed by the template display control section 160 and causes the template display control section 160 to arrange the plurality of templates stored in the template storage section 140 and display the same. Additionally, the template candidate display control section 162 may cause the template display control section 160 to arrange and display the template candidate in the page previous and next to the page of the template displayed by the template display control section 160 and the template candidate in the page following the page of the template displayed by the template display control section 160. Thereby with reference to the template for each page, the templates having variety and unpredictable quality every time the page is changed can be easily selected in view of designing, so that the album which can provide always a new fun to the viewer can be created. Additionally, with reference to the template for each page, the similar template for each page can be selected, the album having a moderated appearance can be created.

The image display control section 164 displays more emphatically the images classified into the group associated with the image layout frame arranged in the template displayed by the template display control section 160 than the images classified into the other groups and displays the same. Additionally, the image display control section 164 displays more emphatically the image classified into the group associated with the layout frame for the main image arranged in the template displayed by the template display control section 160 than the images classified into the other groups. For example, the image display control section 164 displays larger the image associated with the image layout frame than the image not associated with the image layout frame. Additionally, the image display control section 164 may lay out the image associated with the image layout frame at the position more visible to the user, e.g. the upper position in the display section 190 in comparison with the image not associated with the image layout frame. Further, the image display control section 164 may display the image associated with the image layout frame with applying visual effect such as blinking. Here, the image display control section 164 displays more emphatically the image associated with the main image frame than the image associated with the sub-image frame.

when the image layout frame arranged in the template displayed by the template display control section 160 is selected by the user, the image display control section 164 may display more emphatically the image classified in the group associated with the selected image layout frame than the images classified into the other groups. Specifically, the user selects a desired layout frame in which the image is laid out among a plurality of image layout frames arranged in the template displayed by the template display control section 160. Information for identifying the image layout frame selected by the user is provided to the image display control section 164 through the user instruction receiving section 102. Then, receiving the information, the image display control section 164 displays more emphatically the image classified into the group associated with the image layout frame corresponding to the information than the images classified into the other groups. Additionally, when an image is laid out in an image layout frame included in the template, the image display control section 164 may cause the layout display section 192 to display the template in which the image is laid out in the image layout frame.

The use reservation receiving section 170 receives a reservation to use the image displayed by the image display control section 164. Specifically, when the image display control section 164 displays an image to be laid out in the any page other than the page currently laid out by the user, and the user selects the image, information indicating that the reservation to use the image is received is provided to the image selecting section 104 through the user instruction receiving section 102. Then, receiving the information, the image selecting section 104 provides the information to the use reservation receiving section 170. The user reservation receiving section 170 provides the information indicating that the use reservation has been received to the image display control section 164. The image display control section 164 causes the image display section 196 to display the information indicating that the use reservation receiving section 170 has been received the use reservation along with the image. For example, receiving the reservation to use the image, the image display control section 164 may display the image with which a use reservation flag is associated and to which a mark indicating that the image is reserved to use by the image display section 196 is added. Here, the image display control section 164 may associate a used flag with the image has been selected once as an image which should be laid out in the image layout frame in the template of the album. When the image with which the used flag is associated is displayed on the image display section 196 by the image display control section 164, a mark indicative of a used image is added to the image with the used flag.

The album creating apparatus 10 according to the present embodiment classifies a plurality of images into a plurality of groups in association with the kind of album. Then, an image appropriate to be laid out in the image layout frame is automatically selected among the groups associated with the image layout frames and emphatically displayed, so that it can prevent the user from selecting the image independent of the kind of album. Additionally, an image to be laid out in the album is not selected among all of the images but is selected among the image included in a predetermined classified group. Therefore, an image appropriate for the kind of album can be easily and speedily laid out in the image layout frame when the album is created.

The album creating apparatus according to the present embodiment can display the image to be laid out in the album, with which the use reservation flag is associated and to which the mark indicative of the user reservation is added during laying out the album, so that it can prevent the user from using the same image several times. Additionally, the album creating apparatus according to the present embodiment can display the image laid out in the album, with which the used flag is associated and to which the mark indicating that the image has been used once during laying out the album. Therefore, the image can be prevented from being laid out as the main image several times, for example. Additionally, after the image is laid out as the main image once, the image can be easily selected as a sub-image again.

Figure 2:
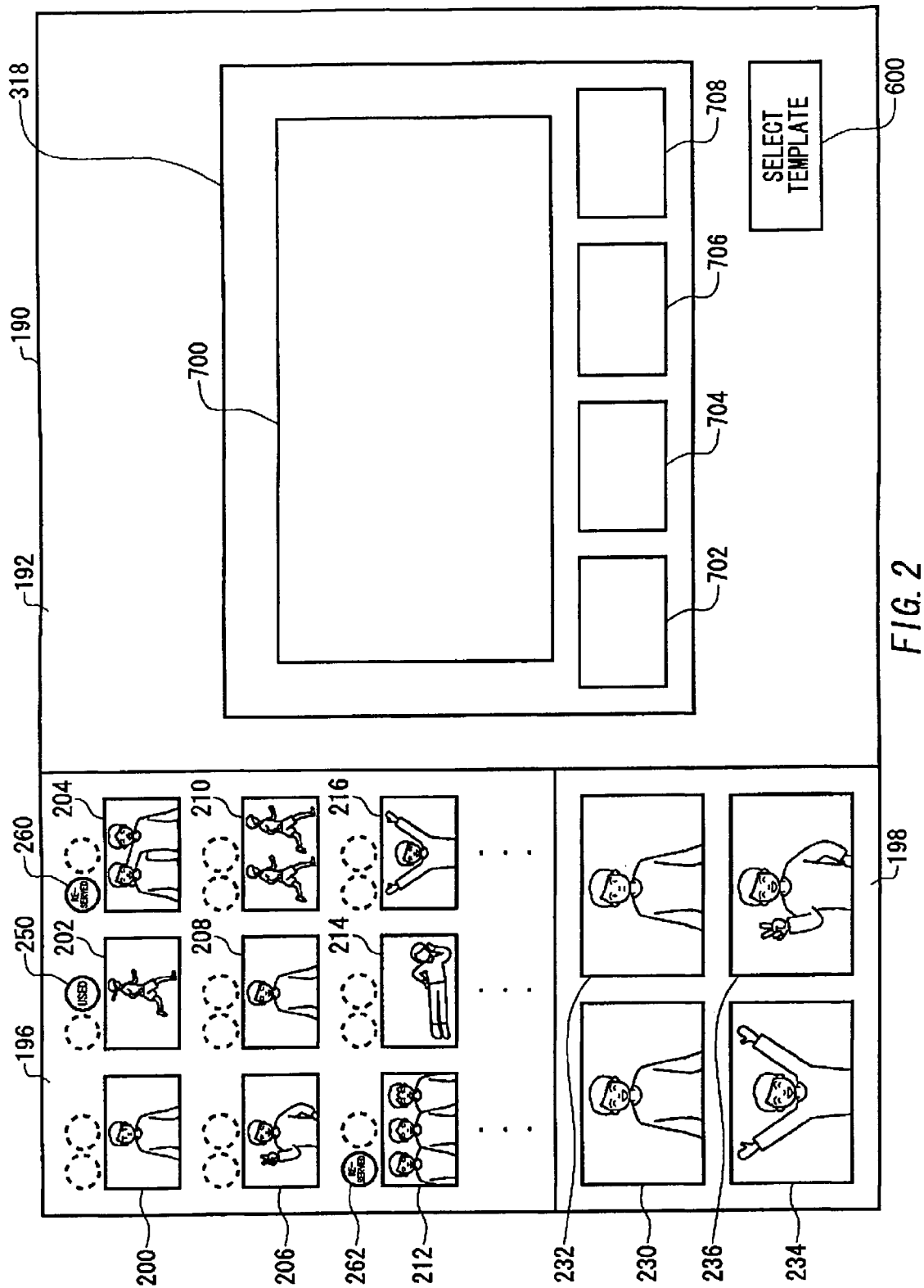
FIG. 2 is a schematic diagram showing a display section 190.
Figure 3:
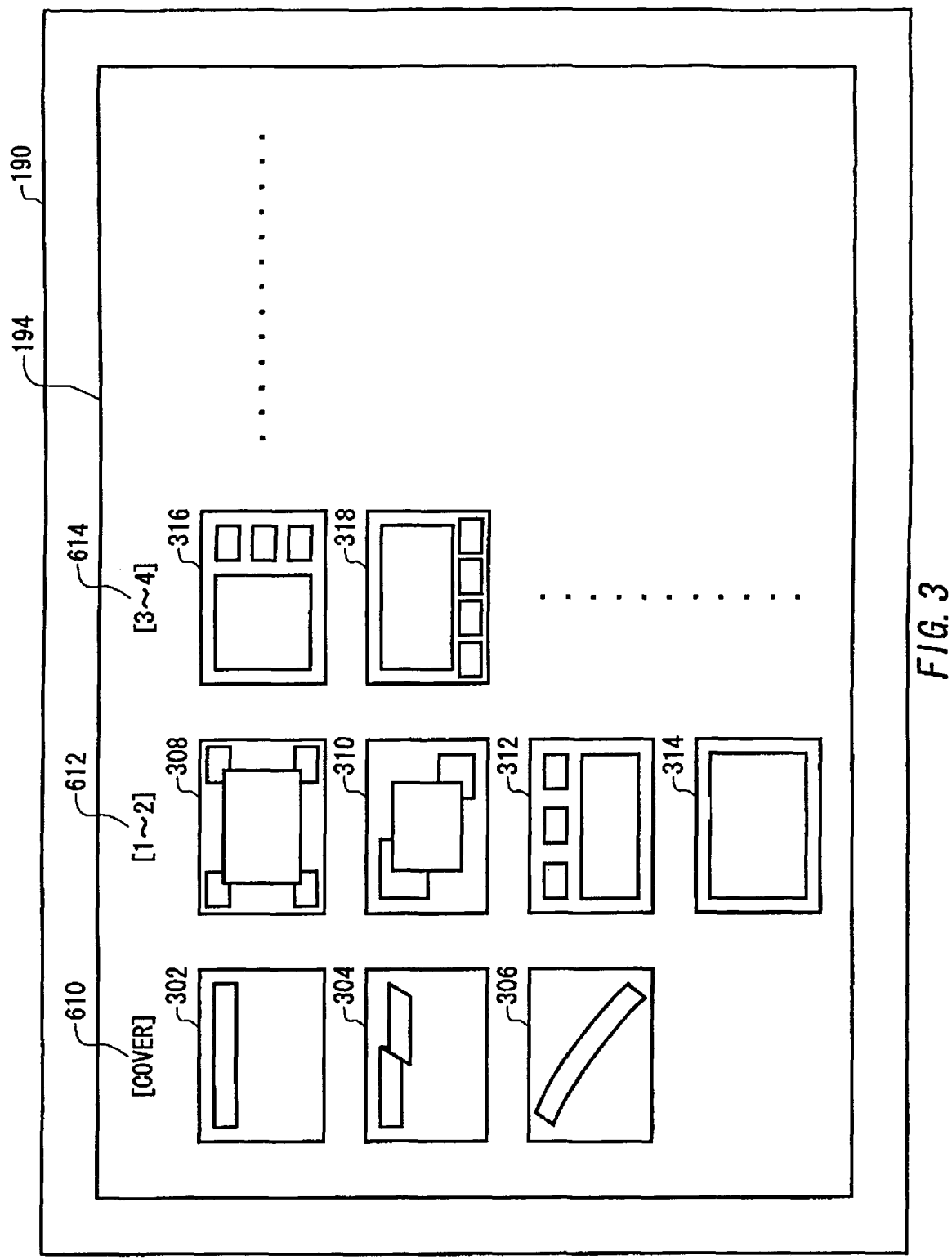
FIG. 3 is a schematic diagram showing a template display section 194.

FIG. 2 is a schematic diagram showing a display section 190 in the album creating apparatus 10 according to the present embodiment. FIG. 3 is a schematic diagram showing a template display section 194 in the album creating apparatus 10 according to the present embodiment. When a user clicks a template selecting button 600, the template candidate display control section 162 may display the template display section 194 substantially all over the display section 190. A plurality of template candidates are arranged and displayed on the template display section 194. Here, as an example of laying out images, default images are previously laid out in a plurality of image layout frames arranged in the plurality of temples. In this case, the default image may be any image inputted to the album creating apparatus 10 and previously stored in the album creating apparatus 10. Additionally, when the user modifies the display of template, the default images laid out in the image frames also may be modified and displayed.

Specifically, a plurality of templates for the facing page of the album are arranged for each of a title 610, a title 612 and a title 614 and displayed. For example, a template 302, a template 304 and a template 306 for layout used for the cover of the album are arranged and displayed in association with the title 610. Additionally, a template 308, a template 310, a template 312 and a template 314 for layout which are used for page 1 and page 2 being the facing pages of the album are arranged and displayed in association with the title 612. Further, a template 316 and a template 318 for layout which are used for page 3 and page 4 being the facing pages of the album are arranged and displayed in association with the title 614. The user can select a desired template among the plurality of displayed templates.

For example, when the user selects the template 318, information for identifying the template 318 selected by the user is provided to the template selecting section 106 through the user instruction receiving section 102. Then, the template selecting section 106 provides the information for identifying the template 318 to the template candidate display control section 162. Receiving the information for identifying the template 318, the template candidate display control section 162 provides the template 318 to the template display control section 160. Then, the template display control section 160 causes the layout display section 192 to display the template 318 as shown in FIG. 2.

When the template 318 is selected, the template display control section 160 provides the information for identifying the template 318 to the classification image storage section 135. The classification image storage section 135 provides the image included in the group associated with the image layout frame arranged in the template 318 to the image display control section 164. Then, the image display control section 164 displays the received image on the image display section 196. For example, the image display control section 164 arranges thumbnail images 200 and so forth of the received image displays on the image display section 196. Here, not the thumbnail images 200 and so forth but an original image which is not thumbnailed may be displayed on the image display section 196. Additionally, an image obtained by reducing the original image may be displayed on the image display section 196.

The display section 190 may further include a candidate image display section 198. The candidate image display section 198 displays larger the image selected among the images included in the group associated with one image layout frame than the thumbnail image displayed on the image display section 196. For example, when the user selects an image layout frame 700, the candidate image display section 198 displays larger a candidate image 230, a candidate image 232, a candidate image 234 and a candidate image 236 appropriate to be laid out in the album, which are selected from the group associated with the image layout frame 700 than the thumbnail images 200 and so forth displayed on the image display section 196. Here, the candidate image display section 198 may evenly arrange and display the candidate images 230 and so forth. Additionally, the candidate image display section 198 displays the candidate images 230 and so forth to which a visual effect is applied.

The album creating apparatus 10 according to the present embodiment can display more distinctly the image to be laid out in the image layout frame 700 than the thumbnail image, so that the user can more easily and visually select the image to be laid out in the image layout frame 700.

When the user selects a desired thumbnail image to be laid out in any template other than the template 318 among the thumbnail images displayed on the image display section 196, the selected thumbnail image 204 and the thumbnail image 212 are displayed with a use reservation mark 260 and a used mark 262, respectively, For example, the user clicks the thumbnail image 204 and the thumbnail image 212 which are reserved to use, the user instruction receiving section 102 provides identifiers for identifying the clicked thumbnail image 204 and the thumbnail image 212 to the use reservation receiving section 170 through the image selecting section 104. The use reservation receiving section 170 provides the identifier for identifying the received thumbnail image 204 and the thumbnail image 212 to the image display control section 164. Then, the image display control section 164 can display a user reservation mark 260 and a user reservation mark 262 indicating that the use reservation receiving section 170 receives the use reservation along with the thumbnail image 204 and the thumbnail image 212.

The album creating apparatus according to the present embodiment can display an desired image with the use reservation mark, which should be laid out in any template other than the template currently used by the user. Therefore, it can prevent the user from laying out the image which is desired to be laid out in any template other than the template currently laid out in any page other than the page in which the image should be laid out.

When there has been already any image laid out in the template before the template 318 is laid out, the thumbnail image 202 of the image is displayed with a used mark 250. Specifically, the image display control section 164 associates a used flag with the image laid out in the image layout frame. Then, when the image with which the used flag is associated is displayed on the image display section 196, the image display control section 164 displays the image with the used mark 250.

The album creating apparatus 10 according to the present embodiment can display the used mark with the image which has been already laid out in the template of the album by the user. Therefore, it can prevent the user from laying out the same image as the main image again.

Figure 4:
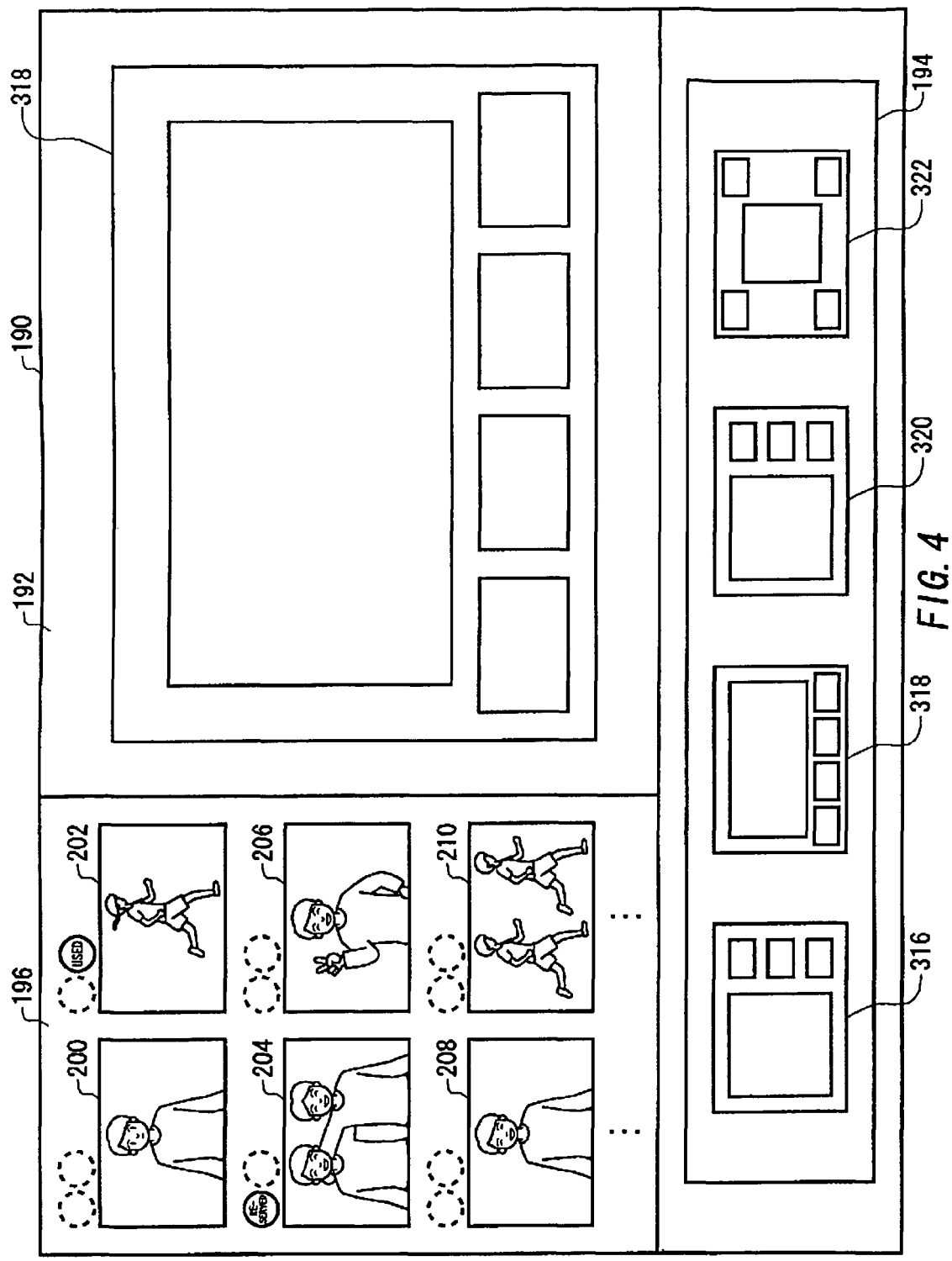
FIG. 4 is a schematic diagram showing a display section 190.

FIG. 4 is a schematic diagram showing a display section 190 in the album creating apparatus 10 according to the present embodiment. The display section includes a layout display section 192, a template display section 194 and an image display section 196. Here, the components having reference numerals the same as those of the components above-described in FIG. 2 and FIG. 3 have functions the same as those above-described in FIG. 2 and FIG. 3, so that the description is omitted.

The user can select a desired template among a plurality of templates 316, 318, 320 and 322 which are displayed on the template display section 194. Here, the template display section 194 may display any template other than the template currently displayed by scrolling. When the user selects a desired template such as the template 318, the selected template 318 is displayed on the layout display section 192.

When the template 318 is selected, the classification image storage section 135 provides the image included in the group associated with the image layout frame arranged in the template 318 to the image display control section 164. Then, the image display control section 164 displays the received image on the image display section 196. For example, the image display control section 164 arranges and displays thumbnail images 200 and so forth of the received images on the image display section 196. The user can lay out a desired image to be laid out in the image layout frame among the thumbnail images 200 and so forth displayed on the image display section 196 by a drag and drop.

FIG. 5 shows an example of a classification method storage section 120 according to the present embodiment. The classification method storage section 120 stores at least one of classification method of classifying images into a plurality of groups in association with the kind of album. The classification method storage section 120 may store a plurality of classification methods having the different indexes in association with one kind of album. The classification method storage section 120 stores, for each kind of album, a classification method of classifying an appropriate image, which is used for selecting the image to be laid out in the album.

The classification method storage section 120 may store classification methods of classifying images into a plurality of groups in association with the taste such as urban and traditional of the album. Specifically, the classification method storage section 120 may store such as lightness and saturation of the image as the classification methods. Additionally, the classification method storage section 120 may store classification methods of classifying images into a plurality of groups in association with the kind of subject included in the image to be laid out in the album. For example, the classification method storage section 120 may store persons, animals such as a cat, articles such as a figurine, vehicles such as a car, buildings and landscape as a classification method.

Additionally, the classification method storage section 120 may store classification methods of classifying images into a plurality of groups in association with the theme of an image. For example, when the kind of album is a travel album, the classification method storage section 120 may store the image capturing place distribution, an image capturing time and date, and a captured person as a classification method. Additionally, the kind of album is an wedding album, the classification method storage section 120 may store a captured person, the number of captured persons, an image capturing time, the appearance frequency of a predetermined person, the size of face of the captured person on the image capturing region and an image capturing place as a classification method.

Further, when the kind of album is a growth record album, the classification method storage section 120 may store a captured person, an image capturing place and the number of captured persons as a classification method. Then, when the kind of album is a school yearbook, the classification method storage section 120 may store an image capturing place, an image capturing time and date, the number of captured person, a captured person and the degree of closeness between the captured persons as a classification method. Additionally, when the kind of album is a night view album, the classification method storage section 120 may store such as a degree of polarization of special frequency of the image as a classification method. Here, the classification method storage section 120 may store classification methods of classifying images into a plurality of groups in association with the designer of the album.

The classification method storage section 120 according to the present embodiment can previously and automatically classify images by the classification method in association with the kind of album. Therefore, the image can be more speedily, appropriately and effectively selected in comparison with the case that the image to be laid out in the album is selected among all of the images.

Figure 6:
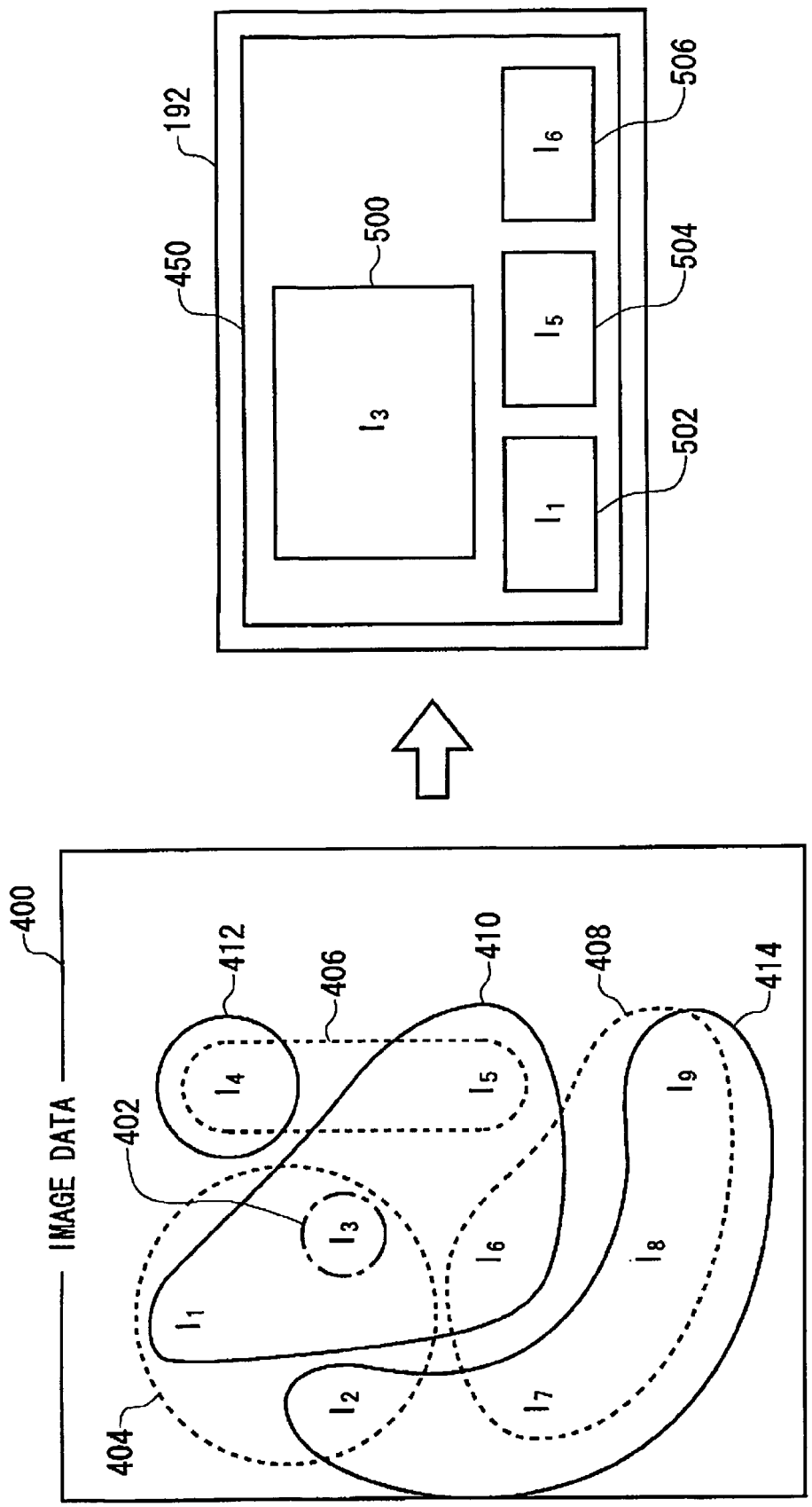
FIG. 6 is a conceptual diagram showing an image classification method and an image layout.

FIG. 6 is a conceptual diagram showing an image classification method in the image classification section 130 and an image layout in the album creating section 150 according to the present embodiment. A plurality of image data of a plurality of images I1, I2, I3 and I4 are included in an image data group 400. When the user selects the kind of album, the classification method storage section 120 provides an index of the image classification method corresponding to the kind of album to the image classification section 130. Then, the image classification method 130 classifies images into a plurality of groups based on the received index of the classification method.

For example, the index of the image classification method is a person and an image capturing date. In this case, the image classification section 130 may classify into each predetermined person. Specifically, the image classification section 130 classifies images into each person included in the image. For example, the image classification section 130 classifies a plurality of images into an image group including a person A indicated by a doted line 404, an image group including a person B indicated by a doted line 406 and an image group including a person C indicated by a doted line 408. Additionally, the image classification section 130 classifies images into a plurality of groups for each image capturing date. For example, the image classification section 130 classifies a plurality of images into an image group indicated by a solid line 410, of which capturing date is D, an image group indicated by a solid line 412, of which capturing date is E, an image group indicated by a solid line 412, of which image capturing date is E and an image group indicated by a solid line 414, of which image capturing data is F.

Next, for example, the user selects a template 450. In this case, when the user selects an image layout frame 500, an image appropriate to be laid out in the image layout frame 500 is selected from the group associated with the image layout frame 500, and automatically laid out in the image layout frame 500. For example, when the image group which includes the person A being a main character and of which capturing date is D is associated with the image layout frame 500, the album creating section 150 selects the image 11 and the image 13 as the images to be laid out in the image frame 500. A condition to further select any image may be added to the image layout frame 500. The album creating section 150 may select the image 13 included within a range meeting with the condition, which is indicated by an alternate long and short dash line 402.

Then, the album creating section 150 lays out the selected image 13 in the image layout frame 500. The condition added to the image layout frames 500 and so forth may be conditions defining that a rate of image capturing region of the person included in the image to the facial region is more than a predetermined value, and that the eyes of the person included in the image are opened. Here, an image to be laid out in the image layout frame may be selected by the user. Next, the album creating section 150 lays out in an image layout frame 502, an image layout frame 504 and an image layout frame 506, the images included in the group associated with each of the image layout frames arranged in the template. Specifically, the album creating section 150 lays out an appropriate image based on the condition of the image and the group associated with the image layout frame arranged in the template.

For example, an group of image which include the person A and of which image capturing date is D associated with the image layout frame 502. Additionally, the condition defining that the image of which resolution is lower than that of the image to be laid out in the image layout frame 500 is also associated with the image layout frame 502. In this case, the image which includes the person A, of which image capturing date is D and of which resolution is lower than that of the image 13 is laid out in the image layout frame 502. For example, when the resolution of the image 11 is lower than that of the image 13, the image 11 may be laid out in the image layout frame 502. Additionally, when the group of the image which includes the person B and of which image capturing date is D is associated with the image layout frame 504, the album creating section 150 lays out the image 15 being an image which includes the person B and of which image capturing date is D in the image layout frame 504. Then, when the group of the image which includes the person C and of which image capturing date is D is associated with the image layout frame 506, the album creating section 150 lays out the image 16 which includes the person C and of which image capturing date is D in the image layout frame 506.

Here, the group into which the image to be laid out is classified by the image classification section 130 is associated with the image layout frame arranged in the template of the album. Additionally, in order to select an appropriate image in the image layout frames, the condition of the image may be further added to the image layout frame arranged in the template of the album. For example, the condition for each of the images to be laid out in the image layout frame 502, the image layout frame 504 and the image layout frame 506 is defined for each of the image layout frame 502, the image layout frame 504 and the image layout frame 506 in association with the image layout frame 500 and may be added each of the condition to the template. For example, a condition may be added to a template 450, which defines that the images to be laid out in the image layout frame 502, the image layout frame 504 and the image layout frame 506 are captured at the date the same as that of the image laid out in the image layout frame 500 and of which resolution is lower than that of the image laid out in the image layout frame 500.

Here, the condition in the image layout frames is not limited to the above-description. For example, when images are classified into the groups based on the kind of subject included in the image, the condition to lay out different subjects in each of a plurality of image layout frames may be added to the template. For example, the condition defined as that the image including the person different from the person included in the image laid out in the image layout frame 500 is laid out may be added to the image layout frame 502, the image layout frame 504 and the image layout frame 506. Additionally, the condition defined as that the image including pets such as a dog and a cat with the person included in the image laid out in the image layout frame 500 is laid out may be added to the image layout frame 502, the image layout frame 504 and the image layout frame 506.

When an image with high-resolution is laid out in a predetermined image layout frame, the condition defined as that an image with lower resolution or higher resolution is laid out may be laid out in any image layout frame other than the image with high-resolution. Here, the condition defined as that the images with the same resolution should be laid out in all of the image layout frames may be added to the template. Further, when the subject included in the image laid out in a predetermined image layout frame is headed a predetermined direction, the condition defined as that the image including the subject headed the same as the predetermined direction or the subject headed the different direction should be laid out in any image layout frame other than the predetermined image layout frame may be added to the template. Additionally, the condition to set the orientation of the image to be laid out in any image layout frame other than a predetermined image layout frame may be added to the template according to the orientation of the image laid out in the predetermined image layout frame. For example, when the image laid out in the image layout frame 500 is in laterally-facing, the condition defined as that the images to be laid out in the image layout frame 502, the image layout frame 504 and the image layout frame 506 should be in longitudinally-facing or laterally-facing may be added.

In the album creating apparatus according to the present embodiment 10, the image classification section 130 classifies a plurality of images into a plurality of groups in association with the classification methods stored in the classification method storage section 120. Then, the album creating section 150 lays out an image appropriate to be laid out in the album, which is selected among the images included in the group classified in the image layout frames with which the group is associated and which is arranged in the template of the album. Therefore, the user can appropriately and speedily create the desired album.

Figure 7:
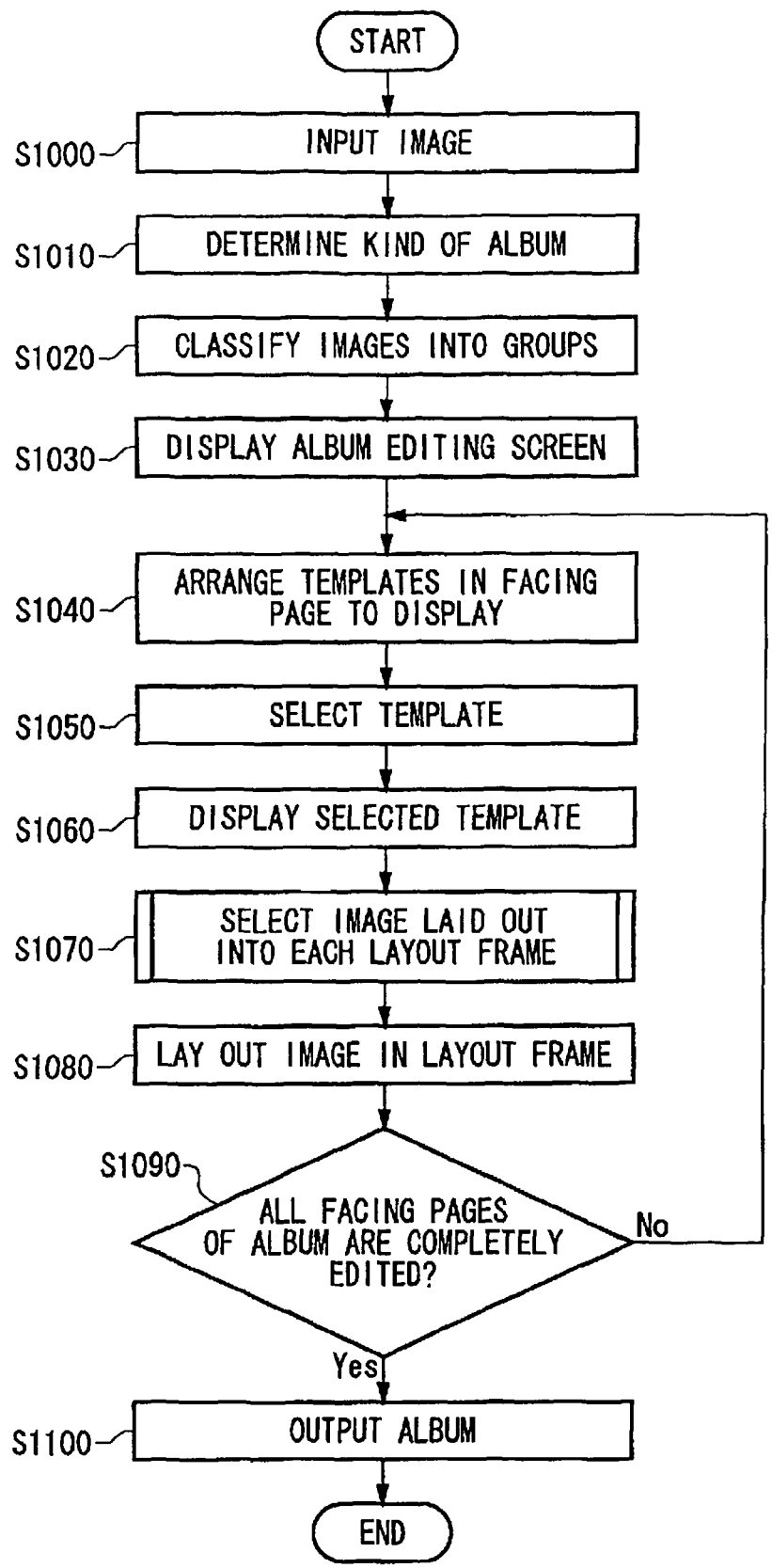
FIG. 7 is a flowchart showing a processing of the album creating apparatus 10.

FIG. 7 is an example of a flow of processing of the album creating apparatus 10 according to the present embodiment. Firstly, the image input section 100 inputs an image (S1000). The image input section 100 provides the inputted image to the kind of album determining section 110. Then, the kind of album determining section 110 analyzes the image received from the image input section 100 to determine the kind of album (S1010). The kind of album determined by the kind of album determining section 110 is provided to the classification method storage section 120. Receiving the kind of album, the classification method storage section 120 provides a classification method corresponding to the kind of album to the image classification section 130.

The image classification section 130 classifies the plurality of images provided from the image input section 100 into a plurality of groups based on the classification method provided from the classification method storage section 120. Next, the album creating apparatus 10 displays an album edit screen on the display section 190 (S1030). Specifically, the album creating apparatus displays the layout display section 192, the template display section 194 and the image display section 196 on the display section 190. Then, the template candidate display control section 162 receives a plurality of templates for the facing page corresponding to the selected kind of album from the template storage section 140, and arranges and displays the same on the template display section 194 (S1040).

The user selects a desired template among the plurality of templates displayed on the template display section 194 (S1050). When the user selects a template, information for identifying the selected template is provided to the template selecting section 106 through the user instruction receiving section 102. The Template candidate display control section 162 provides the template corresponding to the received information to the template display control section 160. Then, the template display control section 160 displays the template selected by the user on the layout display section 192 (S1060). Additionally, the template display control section 160 provides the image of the group associated with at least one image layout frame and the information added to the image layout frame to the classification image storage section 135.

The classification image-storage section 135 provides the image included in the group associated with the image layout frame arranged in the template and the information added to the image layout frame to the album creating section 150. The album creating section 150 selects an image to be laid out in the image layout frame arranged in the template (S1070). Specifically, the album creating section 150 selects an image appropriate for the kind of album among the images included in the group associated with an image layout frame based on the condition added to the image layout frame. Here, the image to be laid out in the image layout frame may be selected by the user. Additionally, the image selected as an image to be laid out in the image layout frame is emphatically displayed by the image display control section 164. Then, the album creating section 150 creates a page of the album by laying out the selected image in the image layout frame (S1080). Next, the album creating section 150 determines whether an editing to lay out images is completed for each of all the facing pages of the album (S1090). When the editing to lay out images for all the facing pages of the album is not completed, templates are continuously selected and images are also continuously laid out for any page other than the facing pages of the album which have been edited (S1090: No).

Meanwhile, when the templates have been completely selected and also the images have been completely laid out for all the facing pages of the album (S1090: Yes), the album creating section 150 provides the album which has been edited to the album output section 155. The album output section 155 prints the received album on paper medium to output the album (S1100). Additionally, the album output section 155 may output the album on a recording medium such as a DVD. Further, the album output section 155 may provide the album to such as a user's PC through a network such as LAN, WAN and Internet.

The album creating apparatus 10 according to the present embodiment classifies a plurality of images into a plurality of groups in association with the kind of album and automatically select an appropriate image from the group associated with the image layout frame as an image to be laid out in the image layout frame arranged in the template of the album. Therefore, it can prevent the user from laying out the image independent of the kind of album selected by the user. Additionally, since it is not necessary to select the image to be laid out in the album among all of the image, the album can be speedily created.

Figure 8:
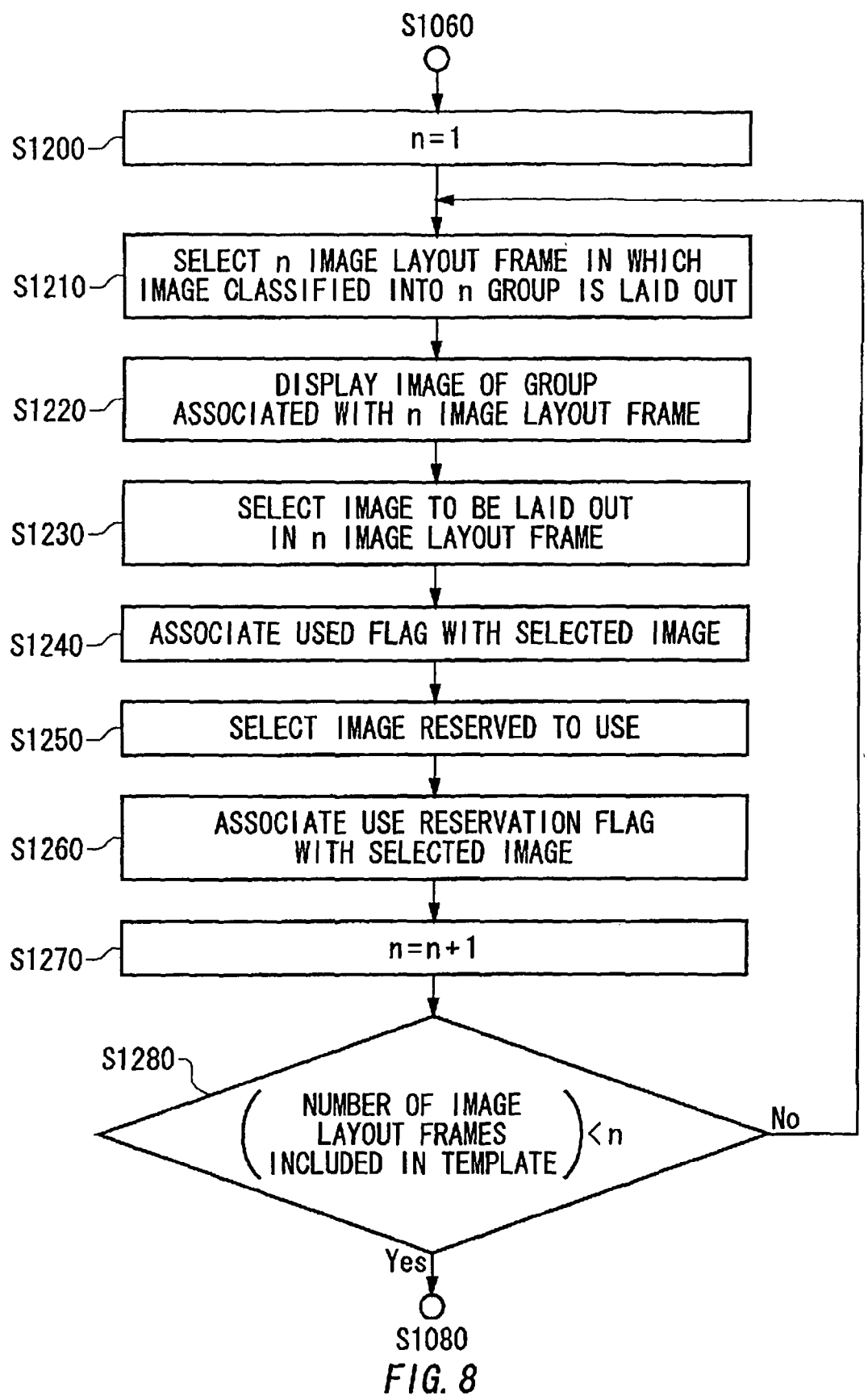
FIG. 8 is a flowchart showing a processing of the album creating apparatus 10.

FIG. 8 is an example of a flow of processing of the album creating apparatus 10 according to the present embodiment. Specifically, FIG. 8 shows a subroutine of the step S1070 for selecting an image to be laid out in the image layout frame above-described in FIG. 7. The album creating section 150 initializes a variable n (S1200). Here, the variable n may be an integer. Next, the user selects a first image layout frame in which the image classified into the first group is laid out (S1210). Specifically, the user selects a desired image layout frame in which the image is laid out (the first image layout frame) among the image layout frames arranged in the template displayed on the layout display section 192. Then, the classification image storage section 135 provides the image included in the group to the image display control section 164 based on the information corresponding to the first image layout frame, which is provided from the template display control section 160 to the classification image storage section 135 when the user selects the template.

Then, the image display control section 164 displays the image included in the group associated with the first image layout frame received from the classification image storage section 135 (S1220). Next, the album creating section 150 selects an image to be laid out in the first image layout frame (S1230). Specifically, the album creating section 150 selects the image to be laid out in the first image layout frame based on the image included in the group corresponding to the first image layout frame and the information added to the image layout frame provided from the template display control section 160 to the classification image storage section 135 when the user selects the template. Here, the image to be laid out in the first image layout frame may be selected by the user.

Next, the image display control section 164 associates a used flag with the image selected by the user (S1240). Thereby the image laid out in the template currently edited by the user can displayed with such as a used mark on the image display section 196. Therefore, when a template different from the template currently edited by the user, the same image can be prevented from being laid out in the image layout again. Additionally, when the same image is intentionally laid out in the album again in view of design, the image which has been laid out in the image layout frame can be easily identified without reviewing the facing pages of the album.

Here, when a desired image to be laid out in any template other than the template which is currently displayed on the layout display section 192, e.g. an image to be laid out as the main image is displayed among the images displayed on the image display section 196, the user selects an image to be used, i.e. an image to be reserved to use (S1250). The information for identifying the image selected by the user is provided to the image selecting section 104 through the user instruction receiving section 102. Receiving the information for identifying the image, the image selecting section 104 provides the information to the use reservation receiving section 170. Receiving the information for identifying the image selected by the user, the use reservation receiving section 170 associates a use reservation flag with the image selected by the user (S1260).

Then, the album creating section 150 adds 1 to the variable n (S1270). The album creating section 150 compares the number of image layout frames arranged in the template currently edited by the user with the variable n (S1280). When the variable n is smaller than the number of image layout frames included in the template, the album creating section 150 determines that there is any image layout frame in which the necessary image is not selected and selects the image again (S1280:No). Meanwhile, when the variable n is larger than the number of image layout frames included in the template, the album creating section 150 determines that the images to be laid out are selected for all of the image layout frames and shifts to the next step (S1080) (S1280:Yes).

The album creating apparatus 10 according to the present embodiment can display the image to be laid out in the album, with which the use reservation flag and to which a mark indicative of the user reservation during laying out the album. Therefore, it can prevent the same image from being laid out redundantly in a plurality of facing page.

Figure 9:
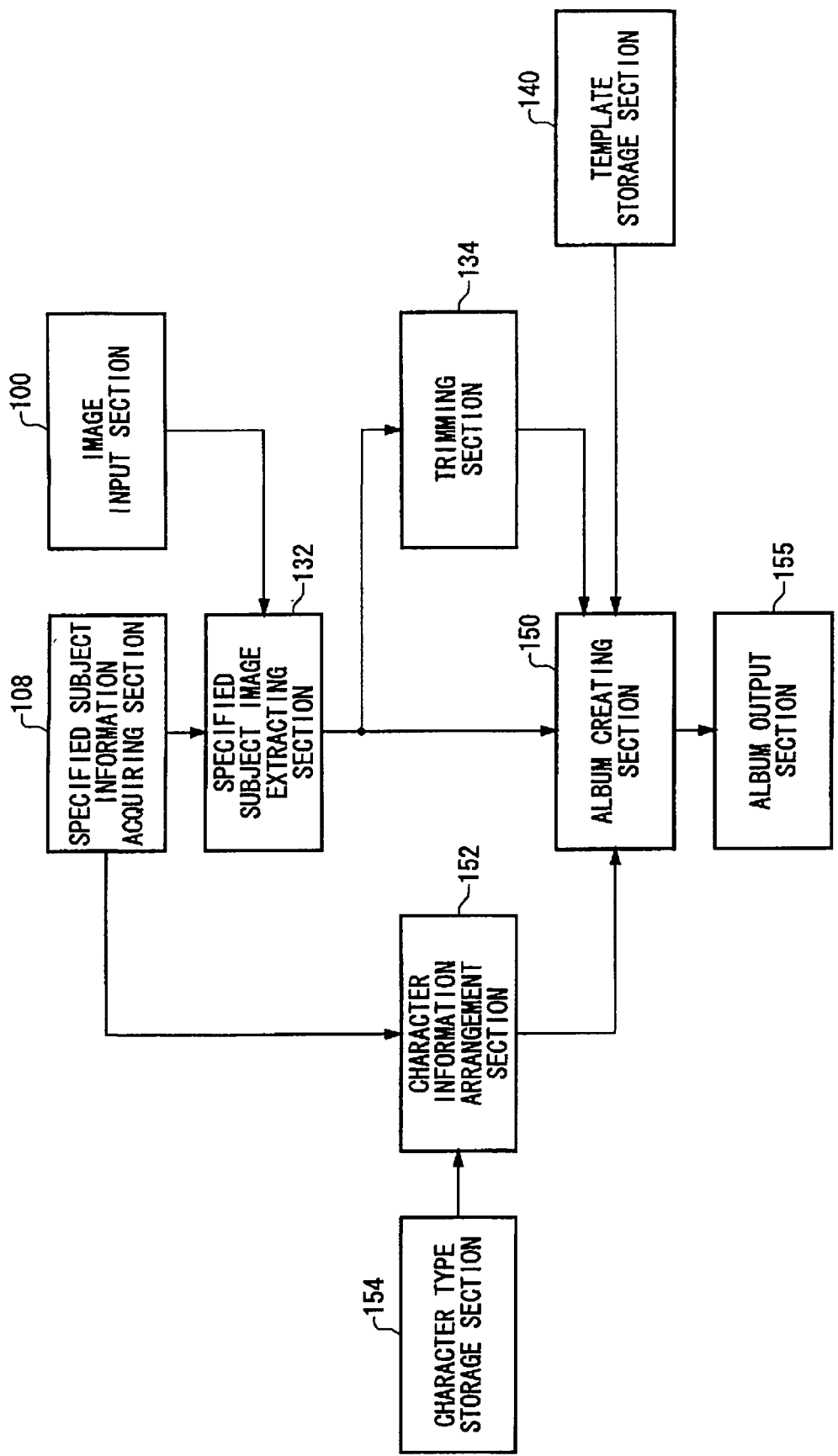
FIG. 9 is a block diagram showing the functional configuration of the album creating apparatus 10.

FIG. 9 is an example of block diagram showing the functional configuration of the album creating apparatus 10 according to another embodiment of the present invention. The album creating apparatus 10 includes an image input section 100, a specified subject information acquiring section 108, a specified subject image extracting section 132, a trimming section 134, a template storage section 140, an album creating section 150, a character information arrangement section 152, a character type storage section 154 and an album output section 155. Here, the album creating apparatus 10 according to the present embodiment may have a part of or all of the configurations and the functions of the album creating apparatus 10 described above with reference to FIG. 1-FIG. 8. The image input section 100 inputs images to the album creating apparatus 10. The image input section 100 may input the images to the album creating apparatus 10 through a recording medium on which the images are stored, such as a memory, and a network such as Internet. The image input section 100 provides the images to the specified subject image extracting section 132 according to the control of the specified subject image extracting section 132. Here, information indicative of the time and date, the place and the condition at which the image is captured may be added to the images inputted by the image input section 100.

The specified subject information acquiring section 108 acquires specified subject information for specifying the subject included in the image. The specified subject information may be the name of the subject included in the image, information for specifying the image including the subject, information indicative of the position of the subject in the image and information indicative of the condition at which the image is captured. Here, the information for specifying the image including the subject may be a file name to uniquely identify the image. The specified subject information acquiring section 108 acquires the specified subject information through a recording medium in which the specified subject information is stored, such as a memory and a network such as Internet. Alternatively, the specified subject information may be inputted to the album creating apparatus 10 by the user through the specified subject information acquiring section 108. Additionally, the specified subject information acquiring section 108 acquires specified subject information including character information indicative of the characteristic of the specified subject. When the subject is a person, for example, the character information indicative of the characteristic of the specified subject may indicate the name of the person, the age, the gender and the color of clothes put on the person. The specified subject information acquiring section 108 provides the acquired specified subject information to the specified subject image extracting section 132 and the character information arrangement section 152.

The specified subject image extracting section 132 extracts the image including the specified subject among the plurality of images received from the image input section 100. Specifically, the specified subject image extracting section 132 extracts the specified subject image including the specified subject specified by the specified subject information received from the specified subject information acquiring section 108. For example, the specified subject image extracting section 132 specifies the image including the specified subject indicated by the specified subject information based on the file name included in the specified subject information. Then, the specified subject image extracting section 132 extracts a subject image included in the image specified based on the file name. Next, the specified subject image extracting section 132 extracts a plurality of specified subject images including the subject through a pattern patching by using the image in the area for the subject included in the extracted image. Here, the specified subject may be the main character in the album. Additionally, the specified subject image extracting section 132 may classify the plurality of extracted subject images into a plurality of groups based on the image capturing time. Specifically, the specified subject image extracting section 132 may classify the plurality of specified subject images into a group including a plurality of images captured within a predetermined period from the time at which one specified subject image is captured, and a group including the images captured out of the a predetermined period from the time at which one specified subject image is captured. The specified subject image extracting section 132 provides the extracted specified subject image to the trimming section 134 and the album crating section 150 according to the control of the album crating section 150. Additionally, the specified subject image extracting section 132 provides one specified subject image and the other specified subject images captured within a predetermined period from the time at which the one specified subject image is captured to the trimming section 134 according to the control of the trimming section 134.

The template storage section 140 stores templates of the output area in which the image layout frames into which the image is laid out and composite information for identifying the image to be laid out in the image layout frame are previously determined. Specifically, the template storage section 140 stores the template which previously defines composite information indicating that a first specified subject image should be laid out in a first image layout frame. Additionally, the template storage section 140 may store a predetermined character information in association with the image layout frames in the template. Here, the template for an album page is an example of templates stored in the template storage section 140. Then, the album page may be a cover, a facing page and one-half of the facing page. Here, the composite information may indicate the orientation of the subject in the image layout frame, the direction component of the image, the image capturing time and date, the kind of subject in the image, the number of subjects in the image, facial expression of the subject and the color of the subject, and also may indicate the content of the image to be laid out in the image layout frame. For example, the first specified subject image may be the main image. The main image is an image intended to most impress on the viewer in the page of the album. For example, the main image may be an image including the main character of the album. Additionally, the main image may be an image most enhanced among a plurality of images laid out in the page. Specifically, the main image may be an image which is larger than the other images, which is laid out more front than the other image and which is laid out at more center than the other image. Additionally, the main image may be an image framed to be enhanced and an image in which a visual effect is applied to the subject. The template storage section 140 provides the template to the album creating section 150.

The trimming section 134 trims the specified subject included in the specified subject image received from the specified subject image extracting section 132 to generate a trimming image. The trimming section 134 may cause the specified subject image extracting section 132 to acquire one specified subject image and the other specified subject image captured within a predetermined period from the time at which the one specified subject image is captured. Then, the trimming section 134 trims the one specified subject image and the other specified subject image, respectively to generate one trimming image and the other trimming image of which occupied area ratio to the specified subject image is different from each other. The trimming section 134 may trim only the area of the specified subject from the specified subject image in order to increase the occupied area ratio of the trimming image to the specified subject image. Additionally, the trimming section 134 may generate a trimming image by changing the aspect ratio of the specified subject image received from the specified subject image extracting section 132. Then, the trimming section 134 may generate the trimming image for each of the plurality of specified subject images received from the specified subject image extracting section 132 with the different aspect ratio each other. Further, the trimming section 134 may apply a predetermined image processing such as a shading to the generated trimming image. The trimming section 134 provides the generated trimming image to the album creating section 150.

The character type storage section 154 stores character type information indicative of the font, the size and the color of characters used for character information in association with information for identifying the subject. The information for specifying the subject, which is stored in the character type storage section 154 may indicate the name of the subject, and may also indicate the gender, the age and the casting of a subject when the subject is a person. Here, the casting may be information indicative of the situation of the person in the album such that the person is the main character in the album, the person is a supporting role or the person has a particular relationship with the main character, e.g. a friend, brothers, parents and grandparents of the main character. The character type storage section 154 provides the character type information indicative of the font, the size and the color of characters to the character information arrangement section 152 according to the control of the character information arrangement section 152.

The character information arrangement section 152 arranges the character information indicative of the characteristic of the specified subject received from the specified subject information acquiring section 108 in the image layout frames in the template. Specifically, character information evoking the content of the image previously laid out in the image layout frame may be arranged in the image layout frames of the template. When the album creating section 150 lays out the specified subject image in the image layout frame, the character information layout section 152 modifies the character information stored in the template storage section 140 in association with the image layout frame according to the specified subject information received from the specified subject information acquiring section 108. Additionally, when the album creating section 150 lays out the specified subject image in the image layout frame, the character information arrangement section 152 may modify a part of the character information stored in the template storage section 140 in association with the image layout frame according to the specified subject information received from the specified subject information acquiring section 108. Then, the character information arrangement section 152 arranges the modified character information in the image layout frames of the template. For example, the character information arrangement section 152 modifies a part of the character information arranged in the image layout frame of the template to the name of the subject indicated by the specified subject information received from the specified subject information acquiring section 108.

Additionally, the character information arrangement section 152 may modify the character information stored in the template storage section 140 in association with the image layout frame based on the character type information stored in the character type storage section 154, and arrange and display the same in the image layout frame. Specifically, the character information arrangement section 152 modifies the font, the size and the color of the character information according to the information indicative of the characteristic of the subject indicated by the specified subject information received from the specified subject information acquiring section 108. More specifically, receiving the age of the subject indicated by the specified subject information from the specified subject information acquiring section 108, the character information arrangement section 152 modifies the character information stored in the template storage section 140 in association with the image layout frame to the font, the size and the color stored in the character type storage section 154 in association with the age. The character information arrangement section 152 provides the modified character information to the album creating section 150 in association with the image layout frame.

The album creating section 150 lays out the specified subject image received from the specified subject image extracting section 132 in the image layout frame based on the composite information previously defined in the template received from the template storage section 140 to create the album. Additionally, the album creating section 150 lays out the trimming image received from the trimming section 134 in the image layout frame to create the album. Receiving from the trimming section 134 one trimming image and the other trimming image of which occupied area ratio to the specified subject image is different from each other, the album creating section 150 may lay out each of the received trimming images in the different image layout frame to create the album. Thereby the album creating section 150 can lay out a plurality of trimming images which are captured at near times. Further, the album creating section 150 arranges the character information received from the character information arrangement section 152 in the image layout frame in which the character information should be arranged. Here, the album creating section 150 not only arranges and displays character information in the image layout frame in association with the character information but also superimposes and arranges the character information on the image layout frame to create the album. The album creating section 150 provides the created album to the album output section 155. The album output section 155 records the album received from the album creating section 150 on a recording medium such as a DVD. Additionally, the album output section 155 may display the album received from the album creating section 150 on a display device such as a HDTV.

The album creating apparatus 10 according to the present embodiment receives specified subject information for specifying the subject included in the image and automatically extracts a specified subject image including the subject among a number of images. Then, the album creating apparatus 10 automatically lays out the specified subject image corresponding to the composite information in the image layout frame of the template to create the image. Thereby the image appropriate for each of the image layout frames of the album can be automatically laid out without selecting by the user to create the image. Additionally, the album creating apparatus 10 according to the present embodiment can modify the character information previously associated with the image layout frame in the template based on the specified subject information and arrange the same. Thereby the character information meeting with the design of the template can be automatically arranged while the consistency with the design of the album template can be kept. Further, the album creating apparatus 10 according to the present embodiment can trim the specified subject image and automatically lay out a plurality of trimming images each of which occupied area ratio to the specified subject image is different from each other in the album template. Therefore, it can prevent similar images from being laid out in the album template, so that an album having richly expressive and excellent design can be automatically created.

Figure 10:
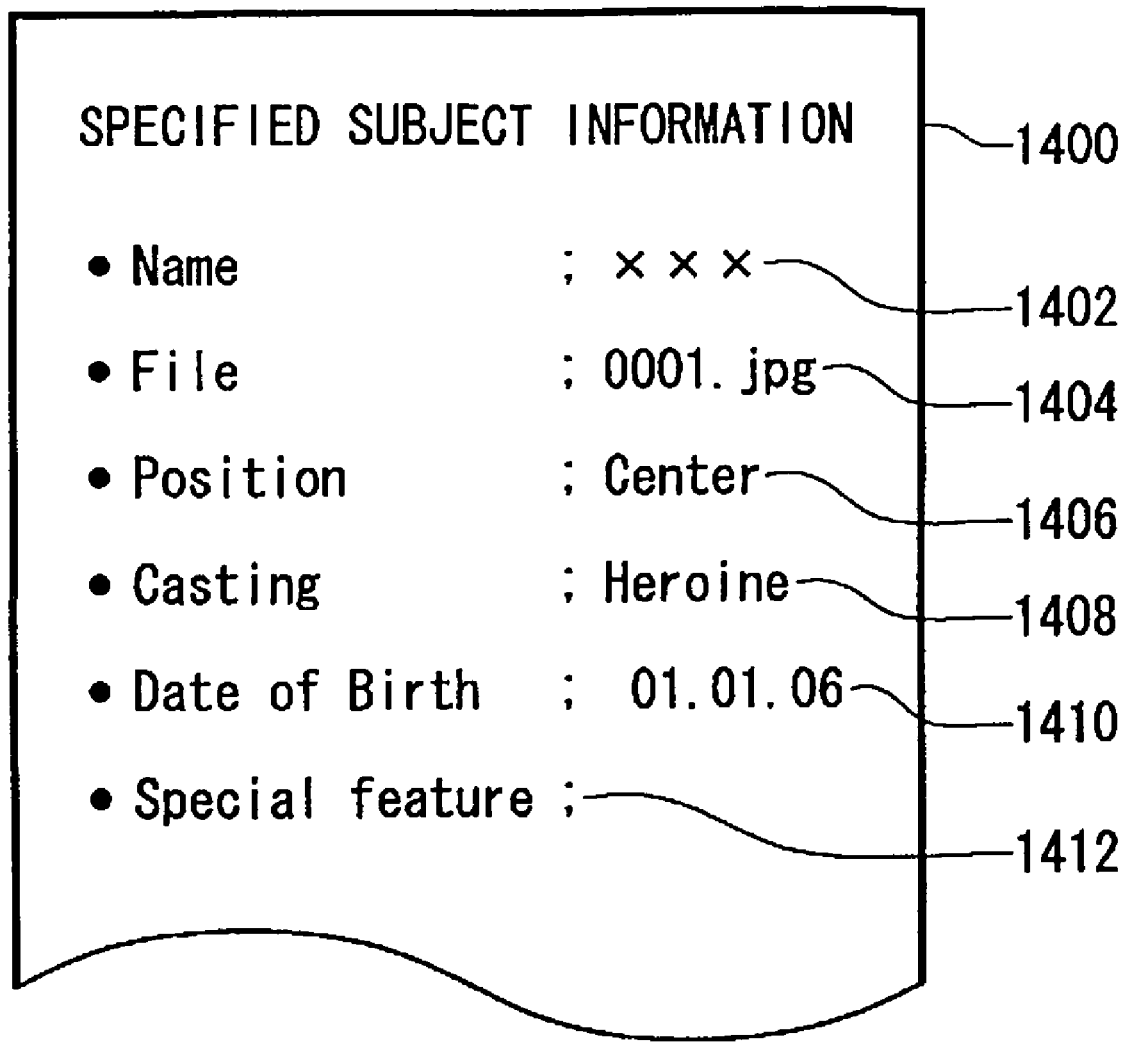
FIG. 10 is a schematic diagram showing a specified subject information 1400.

FIG. 10 is a schematic diagram showing a specified subject information 1400 according to the present embodiment. The specified subject information 1400 may specify the subject included in an image. Specifically, the specified subject information 1400 may be a collection of a specified subject information 1402 indicative of the name of a subject, a specified subject information 1404 indicative of the image including the subject, a specified subject information 1406 indicative of the position of the subject in the image, a specified subject information 1408 indicative of the casting of the subject in the album, a specified subject information 1410 indicative of the date of birth of the subject and a specified subject information 1412 indicative of the other characteristic of the subject. For example, the specified subject information acquiring section 108 receives the specified subject information 1404 and provides the file name of the image including the specified subject to the specified subject image extracting section 132. Then, the specified subject image extracting section 132 extracts the image corresponding to the fail name indicated by the specified subject information 1404 among the images inputted by the image input section 100. Then, the specified subject image extracting section 132 extracts the image of the subject area included in the extracted image from the information indicative of the position indicated by the specified subject information 1406 and extracts the specified subject image including the image among a plurality of images inputted by the image input section 100 by using the extracted image.

Figure 11:
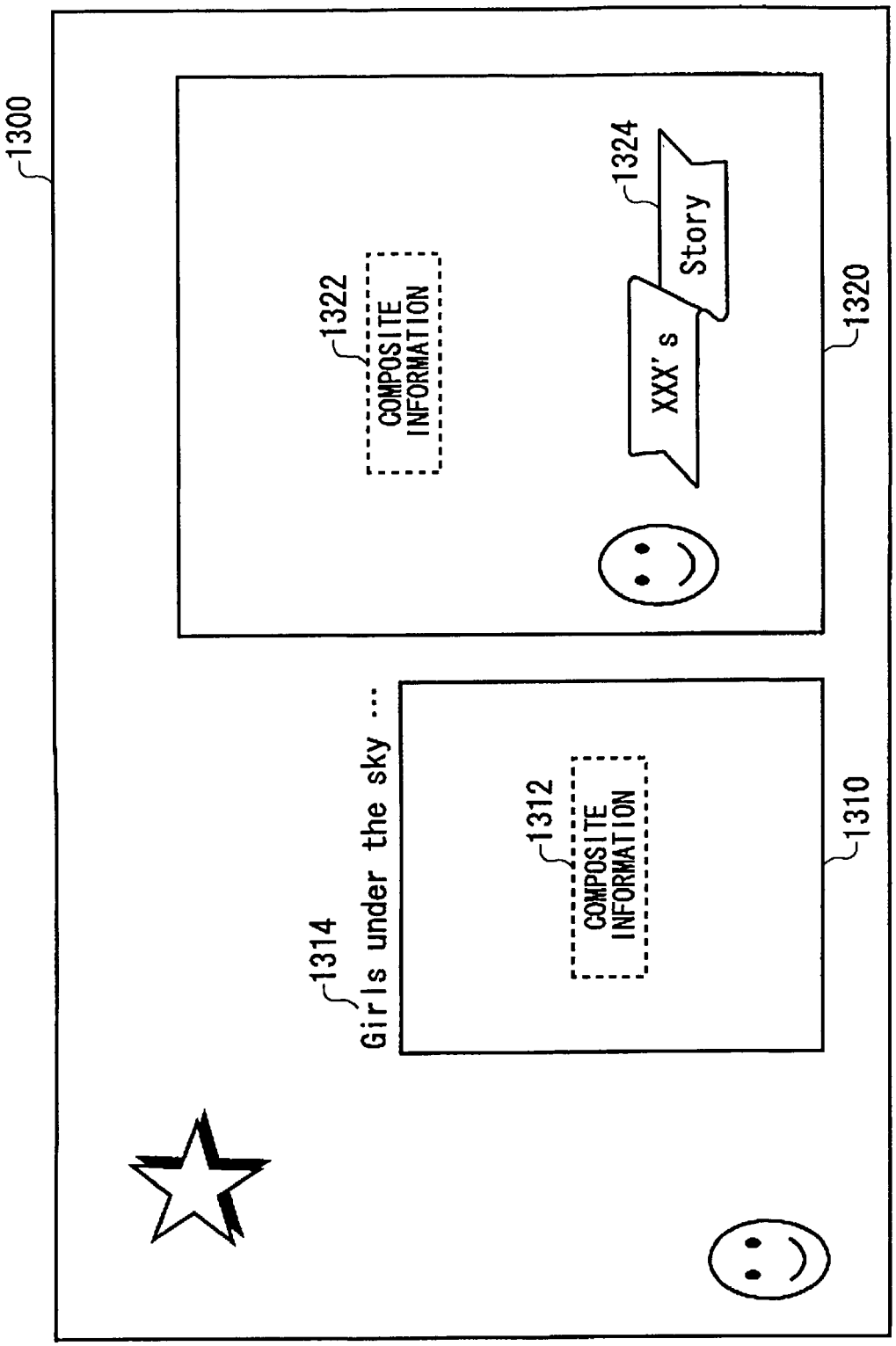
FIG. 11 is a schematic diagram showing a template 1300.

FIG. 11 is an example of template 1300 stored in the template storage section 140 according to the present embodiment. The template storage section 140 stores templates of the output area, which previously define an image layout frame and composite information on an image to be laid out in the image layout frame. Here, one output area may include a plurality of image layout frames. Additionally, the shape of an image layout frame may be substantially circle, substantially polygon, and the shape of object included in the image. For example, a template 1300 includes an image layout frame 1310 and an image layout frame 1320. Then, a composite information 1312 is associated with the image layout frame 1310, and a composite information 1320 is associated with the image layout frame 1320. In this case, the album creating section 150 extracts the composite information 1322 associated with the image layout frame 1320, for example, and receives the specified subject image having the information corresponding to the composite information 1322 from the specified subject image extracting section 132. For example, when information for identifying a predetermined person is associated with the composite information 1322, the album creating section 150 extracts the specified subject image including the person corresponding to the information for identifying the person among the plurality of specified subject images extracted by the specified subject image extracting section 132. Then, the album creating section 150 extracts the specified subject image including the person corresponding to the information which specifies the person among the plurality of specified subject images extracted by the specified subject image extracting section 132. Then, the album creating section 150 lays out the extracted specified subject image in the image layout frame 1320 to create the album.

A character information 1314 is arranged in the template 1300 in association with the image layout frame 1310. Additionally, character information 1324 is a associated with the image layout frame 1320. The character information arrangement section 152 may change the character information 1314 and the character information 1324 according to the specified subject information received from the specified subject information acquiring section 108. For example, receiving information indicative of the name of the subject from the specified subject information acquiring section 108, the character information arrangement section 152 modifies a part of the character information 1324 to the name of subject which has been received, and superimposes and arranges the same on the image layout frame 1320. Here, the character information arrangement section 152 may modify a part of the character information 1324 and arrange the same in the image layout frame 1320. Additionally, when information indicative of the age of the subject from the specified subject information acquiring section 108, the character information arrangement section 152 modifies the font of the character information 1314 to the font of the character stored in the character type storage section 154 in association with the age and arranges the same in the image layout frame 1310. For example, when the subject is a girl, the character information layout section 152 may modify the font of the character information 1314 to round letter and also may modify the color of the character information 1314 to such as pink.

Figure 12:
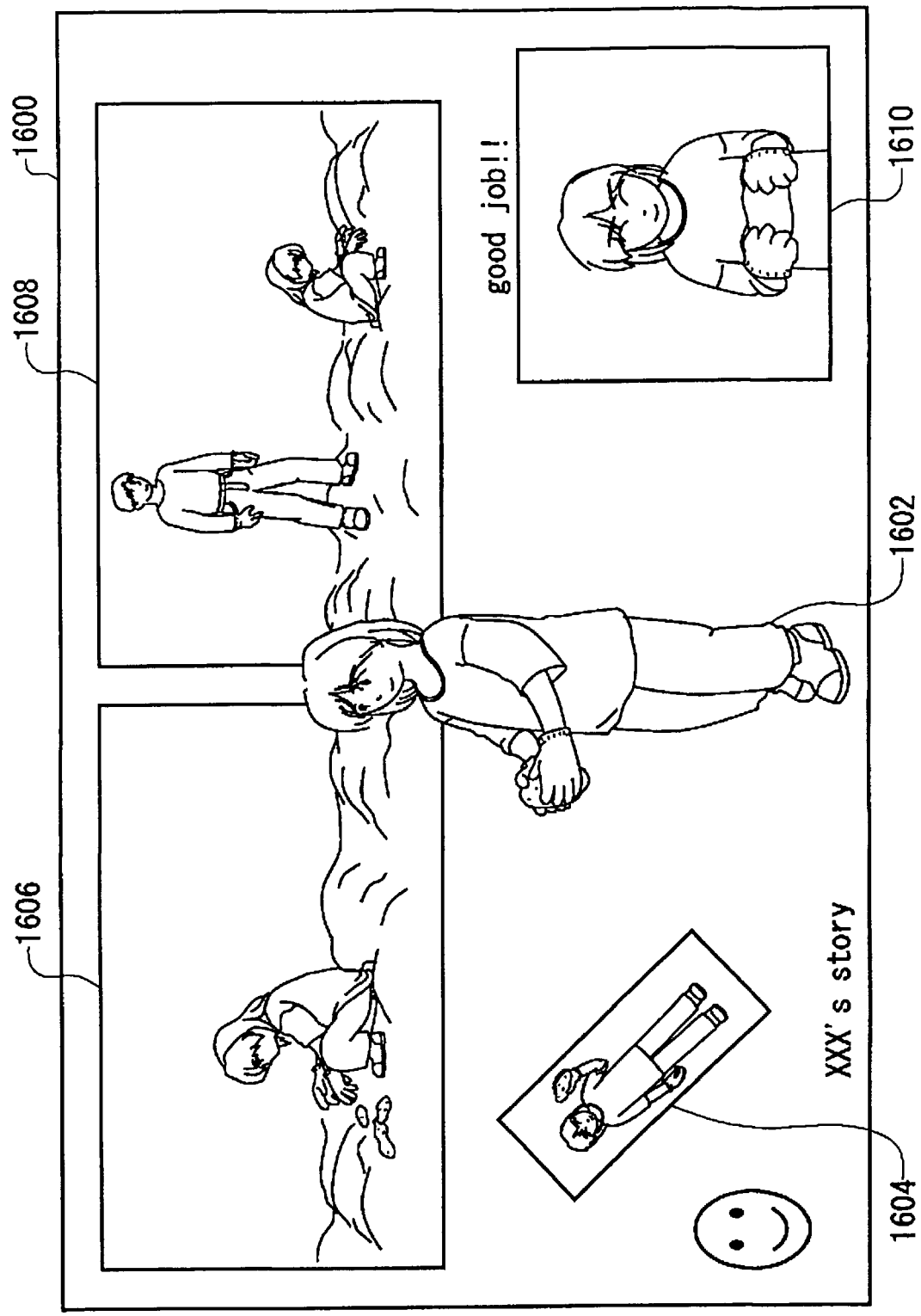
FIG. 12 is a schematic diagram showing a template 1600.

FIG. 12 is an example of a schematic diagram showing a template 1600 stored in the template storage section 140 according to the present embodiment. The album creating section 150 lays out the specified subject image corresponding to the composite information associated with each image layout frame in an image layout frame 1606, an image layout frame 1608 and an image layout frame 1610 of the template 1600. The trimming section 134 trims the specified subject image to create a trimming image 1602 and a trimming image 1604. The album creating section 150 lays out the trimming images generated by the trimming section 134 in the template. The trimming section 134 trims the specified subject included in the specified subject image to generate a trimming image of which occupied area ratio to the specified subject image is increased. Therefore, similar specified subject images can be prevented from being laid out in the album template 1600, so that the album creating apparatus 10 can automatically create an album having richly expressive and excellent design. Here, the trimming section 134 may trim the specified subject included in the specified subject image to generate the trimming image 1602. Additionally, the trimming section 134 may generate the trimming image 1604 by trimming with the aspect ratio different from that of the original image. Further, the trimming section 134 may generate a new trimming image by trimming with the aspect ratio different from that of the trimming image 1604 and lay out the same in the template 1600.

Figure 13:
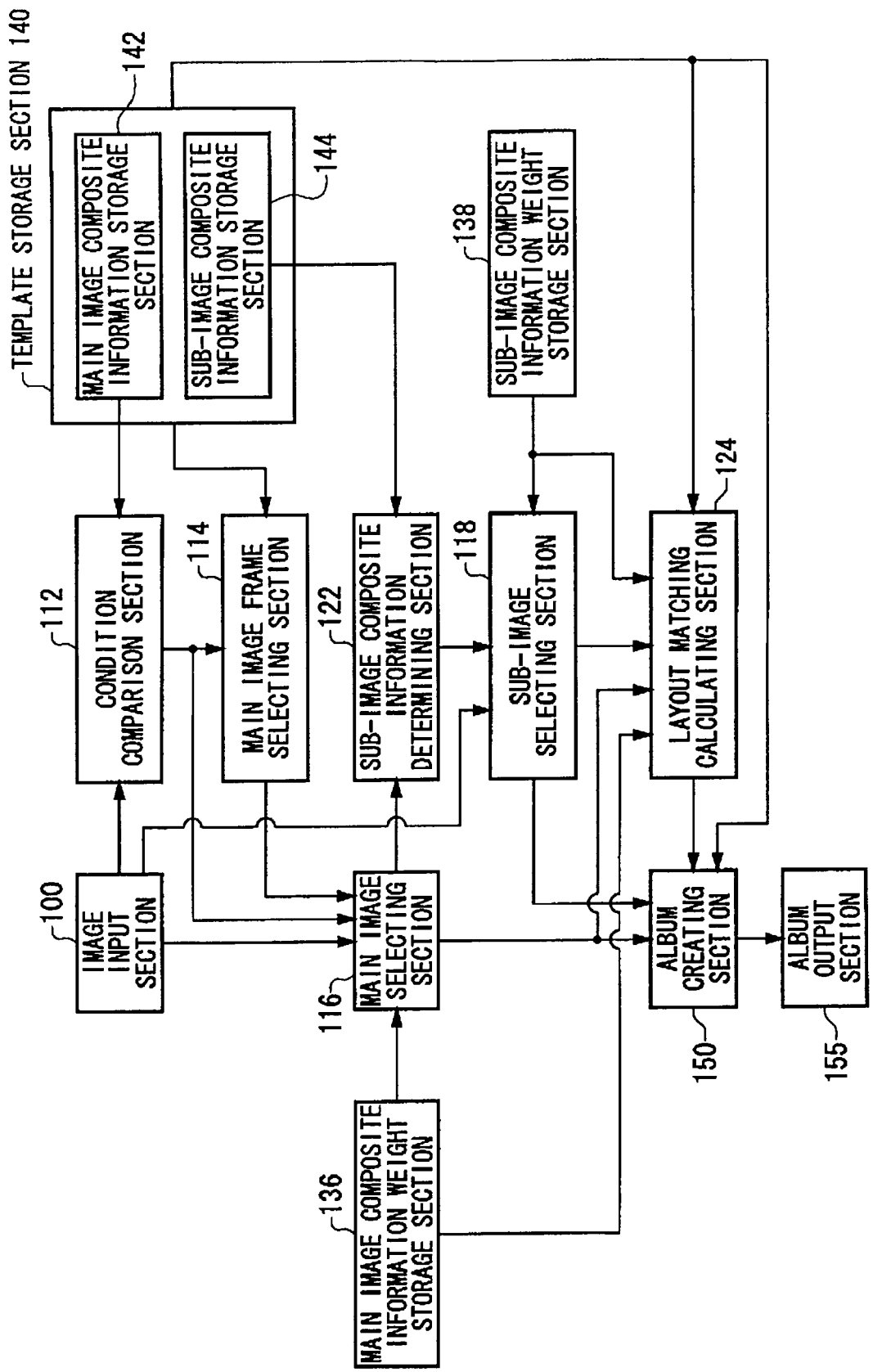
FIG. 13 is a block diagram showing the functional configuration of the album creating apparatus 10.

FIG. 13 is an example of functional configuration of the album creating apparatus 10 according to the present embodiment. The album creating apparatus 10 according to the present embodiment includes an image input section 100, a condition comparison section 112, a main image frame selecting section 114, a main image selecting section 116, a sub-image selecting section 118, a sub-image composite information determining section 122, a layout matching calculating section 124, a main image composite information weight storage section 136, a sub-image composite information weight storage section 138, a template storage section 140, an album creating section 150 and an album output section 155. Additionally, the template storage section 140 includes a main image composite information storage section 142 and a sub-image composite information storage section 144. Here, the album creating apparatus 10 according to the present embodiment may include a part of or all of the configurations and the functions of the album creating apparatus 10 described above with reference to FIG. 1-FIG. 12.

The image input section 100 inputs images to the album creating apparatus 10. The image input section 100 provides the images to the main image selecting section 116 according to the control of the main image selecting section 116. Additionally, the image input section 100 provides the images to the sub-image selecting section 118 according to the control of the sub-image selecting section 118. Further, the image input section 100 provides the images to the condition comparison section 112. Here, information indicative of the time and date, the place and the condition at which the image is captured and information indicative of the characteristic of image, such as the name of the subject, the number of subjects and the clothes of the subject may be previously added to the images inputted by the image input section 100. Here, the album creating apparatus 10 may further include an image analyzing section for extracting information to identify the image included in the image. Thereby the album creating apparatus 10 can acquire information for specifying the subject included in the image without tagging information for specifying the subject previously included in an image on the image inputted by the image input section 100. For example, the album creating apparatus 10 may include a template image storage section in which the template images of a plural kinds of subjects are stored. The image analyzing section may specify the kind of subject included in the image inputted by the image input section 100 by matching with the template image stored in the template image storage section. Additionally, the image analyzing section may specify the number of subjects included in the image, and the lightness and the saturation of the image.

The template storage section 140 stores templates of the output area which previously define image layout frames in which images are laid out and composite information for identifying the image to be laid out in the image layout frame. Additionally, the template storage section 140 includes a main image composite information storage section 142 and a sub-image composite information storage section 144. The main image composite information storage section 142 stores composite information for the main image, which indicates the condition of the main image to be laid out in the image layout frame in association with each of a plurality of image layout frames of the template. The condition of the main image, specifically, may be information for specifying the subject included in the image to be laid out in the image layout frame and an image capturing condition of the image to be laid out in the image layout frame. The image capturing condition may be conditions indicating that the image is captured in doors or out doors, and that the image is captured in a distant view mode or a close view mode, or the condition indicative of a predetermined focal distance. Specifically, the main image composite information storage section 142 may store the conditions of the plurality of main images in association with each of a plurality of predetermined image layout frames. For example, the main image composite information storage section 142 may associate, as the condition of the main image, information indicative of such as the orientation of the main character in the template, the position of the main character in the image, and lightness and saturation of the image laid out in the image layout frame with a predetermined image layout frame. The main image composite information storage section 142 provides the condition of main image to the condition comparison section 112.

The sub-image composite information storage section 144 stores, in association with each of a plurality of image layout frames in the template, composite information for sub-images indicative of the condition of the sub-images to be laid out in the image layout frames, which is determined dependent on the content of the main image laid out in the other image layout frame. Here, the sub-image may be an image including any subject other than the main subject in the album. Additionally, the sub-image may be an image smaller than the main image and disposed at other than the center. Specifically, when any of the plurality of the image layout frames is the image layout frame in which the main image is laid out, the sub-image composite information storage section 144 stores the condition of for each of the sub-images to be laid out in each of the image layout frames other than the main image frame dependent on the content of the main image to be laid out in the main image frame. More specifically, when one image layout frame among the plurality of image layout frames is the main image frame, the sub-image composite information storage section 144 stores the state of the subject included in the image to be laid out in the main image frame and the condition of the sub-image determined dependent on the image capturing condition of the image laid out in the main image frame in association with each of the image layout frames other than the main image frame. Here, the state of the subject may be the kind of subject, the orientation of the subject in the image, and the color and the shape of the subject included in the image. For example, when the subject included in the main image laid out in the main image frame is a person, the sub-image composite information storage section 144 may determine the condition of the content to determine the orientation of the person in the sub-image as the condition for the sub-image dependent on the orientation of the person in the main image. The sub-image composite information storage section 144 provides the condition for the sub-image to the sub-image composite information determining section 122.

The condition comparison section 112 compares the plurality of images received from the image input section 100 with each of the conditions of the main image indicated by the composite information for the main image received from the main image composite information storage section 142. Specifically, the condition comparison section 112 compares the content of the image with each of the conditions of the main image associated with the image layout frame in the template and extracts the condition of the main image corresponding to the content of the image for each of the image layout frames from the main image composite information storage section 142. For example, the condition comparison section 112 compares the information which specifies the subject included in the image associated with the image received from the image input section 100 with information indicated by the condition of the main image associated with a predetermined image layout frame and extracts the corresponded condition for the main image. Here, the image analyzing section may analyze the image and provides information for specifying the subject included in the image to the condition comparison section 112. The condition comparison section 112 provides the comparison result to the main image frame selecting section 114 and the main image selecting section 116.

The main image composite information storage section 136 stores the weight of the condition of the main image in association with each of the conditions of the main image indicated by the composite information for the main image stored in the main image composite information storage section 142. Specifically, the main image composite information weight storage section 136 may store the weight according to the theme of the album in association with each of the condition of the main image. More specifically, the main image composite information weight storage section 136 stores the different weight for each of the plurality of conditions of the main image. For example, the main image composite information storage section 142 associates the different weight with a condition A which indicates that the image includes only the main character, a condition B which indicates that the image is captured outdoors, a condition C which indicates that the light source is sunlight and a condition D which indicates that the color of clothes of the main character is the predetermined color. For example, the theme of the album is "excursion", the main image composite information storage section 142 may associate larger weight with the condition b than the condition d. The main image composite information weight storage section 136 provides the weight of condition of the main image to the main image selecting section 116 and the layout matching calculating section 124.

The main image composite information weight storage section 138 stores the weight of condition for the sub-image in association with each of the conditions of the sub-image indicated by the composite information for the sub-image stored in the sub-image composite information storage section 144. The sub-image composite information weight storage section 138 may associate the weight according to the theme of the album with each of the conditions of the sub-image and store the same. Specifically, the sub-image composite information storage section 138 associates the different weight of each of the conditions of the plurality of sub-images and stores the same. Additionally, when there is the condition for the sub-image the same as that of the main image, the sub-image composite information weight storage section 138 may determine that the weight of the sub-image is smaller than that of the main image stored in the main image composite information storage section 136 and store the same. The sub-image composite information weight storage section 138 provides the weight of the sub-image to the sub-image selecting section 118 and the layout matching calculating section 124.

The main image frame selecting section 114 selects a main image frame in which the main image is laid out among the plurality of image layout frames included in the template. Additionally, the main image frame selecting section 114 selects an image layout frame in which the content of image is most matched with the condition of the main image associated with the image layout frame as a main image frame in which the main image should be laid out. Specifically, the main image layout selecting section 114 may analyze the comparison result received from the comparison result section 112 and determine the image layout frame in which the largest number of conditions of the plurality of main images associated with one image layout frame is matched with the content of the image as the main image frame. For example, there are four conditions of the main image associated with one image layout frame, such that the main character is included in the image, that the main character is in a predetermined direction, that the color of clothes put on the main character included in the image is a predetermined color, and that the time and date at which the image is captured is a predetermined time and date. In this case, the main image frame selecting section 114 selects an image layout frame in which the image most matched with the plurality of conditions of the main image is laid out, i.e. in which the image most matched with the four conditions of main image is laid out as the main image frame. The main image frame selecting section 114 provides the information on the selected main image frame to the main image selecting section 116.

The main image selecting section 116 selects a main image to be laid out in the main image frame among the plurality of images received from the image input section 100 in association with the main image frame indicated by the information on the main image frame received from the main image frame selecting section 114 based on the composite information for the main image stored in the main image composite information storage section 142. Additionally, the main image selecting section 116 selects the image of which content is most matched with the condition of the main image associated with the plurality of image layout frames as the main image frame. Specifically, the main image selecting section 116 selects as the main image the image matched with the condition of the main image of which weight stored in the main image composite information weight storage section 136 is largest in association with the condition of the main image which is most matched with the content of the image among the plurality of images received from the image input section 100. Additionally, the main image selecting section 116 may receive the weight associated with each of the conditions of the main image frame which is matched with the contents of the plurality of images received from the image input section 100 from the main image composite information weight storage section 136, calculate the total value for the plurality of received weights and select the image in which the calculated total value of weights is largest as the main image. The main image selecting section 116 provides the selected main image to the album creating section 150. Additionally, the main image selecting section 116 provides information indicative of the content of the selected main image to the sub-image composite information determining section 122. Here, the main image frame selecting section 114 may select the main image frame in which the main image selected by the main image selecting section 116 is laid out as the main image frame.

The sub-image composite information determining section 122 determines, for each sub-image, the condition of the sub-image indicated by the composite information for the sub-image stored in the sub-image composite information storage section 144 in association with the sub-image frame being an image layout frames other than the main image frame based on the content of the main image received from the main image selecting section 116. Specifically, the sub-image composite information determining section 122 determines the condition of the sub-image determined dependent on the content of the main image among the conditions of the sub-image stored in the sub-image composite information storage section 144. For example, the sub-image composite information determining section 122 may determine the condition of the sub-image as the condition that the orientation of the person included in the sub-image is the same as or the different from that of the main character included in the main image in the template. The sub-image composite information storage section 122 provides the determined condition of the sub-image to the sub-image selecting section 118.

The sub-image selecting section 118 selects for each image layout frame the image matched with the condition of the sub-image determined by the sub-image composite information determining section 122 among the plurality of images inputted by the image input section 100. The sub-image selecting section 118 may select the image which is most matched with the condition of the sub-image determined for each sub-image by the sub-image composite information determining section 122 as the sub-image to be laid out in the sub-image frame. For example, the sub-image selecting section 118 may select the image in which the largest number of conditions are matched with the conditions of plurality of sub-images associated with the image layout frame as the sub-image. Additionally, the sub-image selecting section 118 may select as the sub-image the image meeting with the condition of the sub-image in which the weight stored in the sub-image composite information weight storage section 138 in association with the condition of the sub-image determined for each sub-image by the sub-image composite information determining section 122 is largest. Further, the sub-image selecting section 118 may calculate the total value of the weights of the conditions of the sub-image stored in the sub-image composite information weight storage section 138 in association with each of the conditions of the sub-image matched with the contents of the plurality of images inputted by the image input section 100 in the image layout frame and select the image of which calculated total value of weight is largest as the sub-image. The sub-image selecting section 110 provides the selected sub-image to the album creating section 150 and the layout matching calculating section 124.

The layout matching calculating section 124 calculates the degree of matching with the condition of the main image stored in the main image composite information storage section 142 in association with the content of the main image selected by the main image selecting section 116 and the main image frame selected by the main image frame selecting section 114. Additionally, the layout matching calculating section 124 calculates the degree of matching with the condition of the sub-image stored in the sub-image composite information storage section 144 in association with the content of the sub-image selected by the sub-image selecting section 118 and the sub-image frame in which the sub-image is laid out. For example, the layout matching calculating section 124 calculates the degree of matching of the layout higher when the condition of the main image or the sub-image is more matched with the information indicative of the content of the image. Then, the layout matching calculating section 124 calculates for each layout the degree of matching of the layout in which each of the plurality of image layout frames is the main image frame based on the degree of matching between the calculated main image frame and the condition of the main image and the degree of matching between the calculated sub-image frame and the condition of the sub-image. Additionally, the layout matching calculating section 124 sums the weight of the main image stored in the main image composite information weight storage section 136 in association with the condition of the main image in the main image frame, which is matched with the content of the main image selected by the main image selecting section, and the weight of the sub-image stored in the sub-image composite information weight storage section 138 in association with the condition of the sub-image in the sub-image frame, which is matched with the content of the sub-image selected by the sub-image selecting section. Then, the layout matching calculating section 124 may calculate for each layout the weight of the layout when each of the plurality of the image layout frames is as the main image frame. The layout matching calculating section 124 provides the calculated degree of matching for each layout to the album creating section 150.

The album creating section 150 lays out the main image received from the main image selecting section 116 into the main image frame, and also lays out the sub-image received from the sub-image selecting section 118 into the sub-image frame, respectively to create an album. Additionally, the album creating section 150 creates an album in which the degree of matching of the layout calculated for each layout by the layout matching calculating section 124 is highest. Specifically, the album creating section 150 creates an album in which the weight of the layout calculated by the layout matching calculating section is largest. The album creating section 150 provides the created album to the album output section 155. The album output section 155 records the album received from the album creating section 150 on a recording medium such as a DVD. Additionally, the album output section 155 may display the album received from the album creating section 150 on a display device such as a HDTV.

The album creating apparatus 10 according to the present embodiment includes the template in which the condition for the main image and for the sub-image are previously associated with each image layout frame. Then, the album creating apparatus 10 according to the present embodiment compares the plurality of images inputted to the album creating apparatus 10 with the condition of the main image, automatically selects an image which most matched with the condition of the main image as the main image, and automatically selects a main image frame in which the main image is laid out. Subsequently, the condition of the sub-image to be laid out in the sub-image frame is automatically selected dependent on the content of the selected main image. Therefore, an album with the excellent layout in design can be automatically created without designating the layout for each of the plurality of images by the user.

Figure 14:
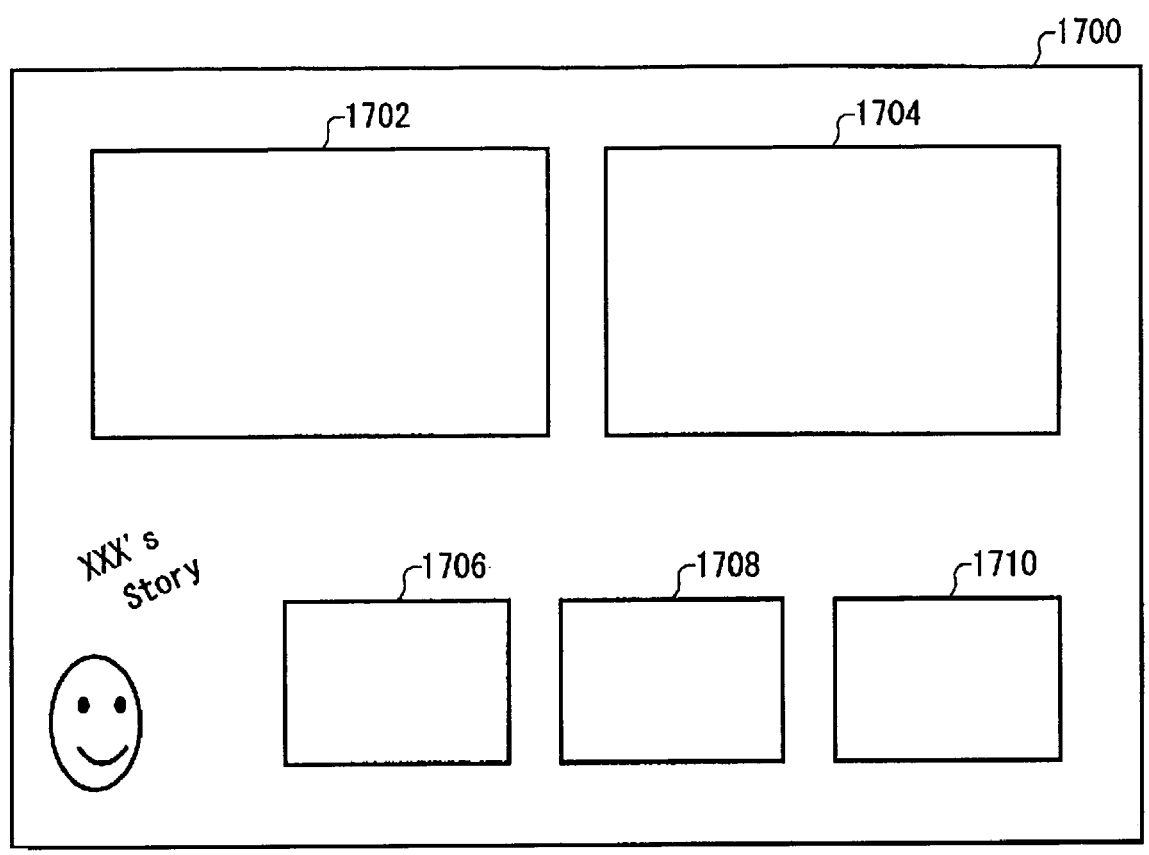
FIG. 14 is a schematic diagram showing a template 1700.

FIG. 14 shows an example of a template 1700 stored in the template storage section 140 according to the present embodiment. FIG. 15 shows an example of the main image composite information storage section 142 according to the present embodiment. FIG. 16 shows an example of the sub-image composite information storage section 144 according to the present embodiment.

The template 1700 has a plurality of image layout frames 1702 and so forth. At least one of the condition of the main image and the condition of the sub-image is associated with each of the image layout frames 1702 and so forth. Specifically, the main image composite information storage section 142 stores the condition of the main image, and the sub-image composite information storage section 144 stores the condition of the sub-image. For example, the main image composite information storage section 142 stores a condition a and a condition b for the main image in association with the image layout frame 1702. In the same way, the main image composite information storage section 142 stores the condition for the main image in association with each of the image layout frames 1704 and so forth. Here, the main image composite information storage section 142 may store the condition of the main image only about a part of the plurality of image layout frames included in the template 1700. Specifically, the main image composite information storage section 142 may store the condition of the main image in association with only the image layout frames of which size is larger a predetermined size. For example, the main image composite information storage section 142 may associate the condition of the main image with only the image layout frame 1702 and the image layout frame 1704 and store the same.

The condition comparison section 112 compares the plurality of images inputted by the image input section 100 with the condition of the main image associated with each of the image layout frame 1702 and the image layout frame 1704 in which the main image should be laid out, respectively. Then, the main image selecting section 114 selects the main image frame based on the comparison result by the condition comparison section 112. Specifically, the main image frame selecting section 114 selects as the main image frame the image layout frame in which the image of which number of contents are more matched with the condition of the main image should be laid out based on the comparison result obtained by comparing the condition of the main image in the image layout frame 1702 with the content of the image, and the comparison result obtained by comparing the condition of the main image in the image layout frame 1704 with the content of the image. For example, the condition for five images is associated with each of the image layout frame 1702 and the image layout frame 1704, respectively. In this case, among a plurality of images inputted by the image input section, if the number of images of which content is most matched with the condition of the main image in the image layout frame 1702 is four, or the number of images of which content is most matched with the condition of the main image in the image layout frame 1704 is three, the main image frame selecting section 114 selects the image layout frame 1702 as the main image frame.

Additionally, based on the comparison result obtained by comparing the condition of the main image in the image layout frame 1702 with the content of the image and the comparison result obtained by comparing the condition of the main image in the image layout frame 1704 with the content of the image, the main image frame selecting section 114 may select as the main image frame the image layout frame of which weight stored in the main image composite information storage section 126 in association with each of the conditions of the main image matched with the content of the image is largest. For example, the main image frame selecting section 114 compares the condition of the main image of which weight is largest among the condition for the plurality of main images associated with the image layout frame 1702 with the condition of the main image of which weight is largest among the condition for the plurality of main images associated with the image layout frame 1704, and selects the image layout frame with which the condition of the main image of which larger weight is associated as the main image frame. Further, the main image frame selecting section 114 may select as the main image frame the image layout frame of which total value of the weights stored in the main image composite information weight storage section 126 associated with each matched condition of the main image based on the comparison result obtained by comparing the condition of the main image in the image layout frame 1702 with the content of the image, and the comparison result obtained by comparing the condition of the main image in the image layout frame 1704 with the content of the image. For example, the main image frame selecting section 114 may select as the main image frame the image layout frame of which total value of weight is larger by comparing the total value by summing the weights of conditions of the plurality of main images associated with the image layout frame 1702 and the total value by summing the weights of conditions of the plurality of main images associated with the image layout frame 1704.

Additionally, the main image selecting section 116 selects the image of which content is most matched with the condition of the main image associated with the main image frame selected by the main image frame selecting section 114 among the plurality of images inputted by the image input section 100. For example, the main image selecting section 116 may select as the main image the image in which the largest number of contents is matched with that of the plurality of main images in the image layout frame 1702. Additionally, the main image selecting section 116 may select as the main image the image of which contents is matched with the condition of the main image of which weight is largest among the weights stored in the main image composite information weight storage section 136 in association with each of the conditions for the main image. Further, the main image selecting section 116 sums the weights stored in the main image composite information weight storage section 136 in association with each of the conditions for at least one main image matched with the plurality of conditions for the main image in the image layout frame among the plurality of images inputted by the image input section 110, and selects the image of which total value of weights is largest as the main image.

The sub-image composite image information determining section 122 determines the contents of the sub-images to be laid out in the image layout frame 1704, the image layout frame 1706, the image layout frame 1708 and the image layout frame 1710 other than the main image frame selected by the main image frame selecting section 114 dependent on the content of the main image selected by the main image selecting section 116. For example, the sub-image composite information storage section 144 may store the plurality of conditions of the sub-image dependent on the content of the main image. For example, when the main image is laid out in the image layout frame 1702, the sub-image composite information determining section 122 determines the conditions of the sub-images to be laid out in the image layout frames other than the image layout frame 1702. For example, the sub-image composite information determining section 122 may determine the color of clothes of the person included in the sub-image based on the color of clothes of the main character included in the main image. Additionally, the sub-image composite information determining section 122 may determine a pose of the person included in the sub-image based on the pose of the person included in the main image. Further, when the main image is laid out in the image layout frame 1704, the sub-image composite information determining section 122 determines the condition of the sub-image laid-out in the other image layout frame based on the content of the main image laid out in the image layout frame 1704.

Additionally, when the main image is laid out in the image layout frame 1702 or 1704, the layout matching calculating section 124 may calculate each weight of the layout in the template 1700. Then, the layout matching calculating section 124 may provide the layout of which weight is larger to the album creating section 150. For example, when the main image is laid out in the image layout frame 1702, each of the sub-images corresponding to the condition of the sub-image determined dependent on the content of the main image is laid out in the image layout frame other than the image layout frame 1702. Then, the layout matching calculating section 124 calculates for each of the plurality of image layout frames the total value of weights of the conditions such that the content of the image to be laid out is matched with the condition of the main image or the sub-image in the image layout frame and sums for each layout the calculated weight of each image layout frame. Then, the layout matching calculating section 124 determines that the layout of which weight calculated for each layout is largest as the layout in which the condition of the main image or the sub-image in the plurality of image layout frames is most matched with the content of the main image or the sub-image and provides the same to the album creating section 150.

The album creating apparatus 10 according to the present embodiment can automatically determine the condition of the sub-image to be laid out in the other sub-image frame dependent on the content of the main image laid out when the main image is laid out in one image layout frame, so that an album with the excellent layout in design can be easily created. Additionally, the album creating apparatus 10 according to the present embodiment can calculate the weight of the layout by using the weight of the conditions of the main image and the sub-image associated with a plurality of image layout frames when each of the plurality of image layout frames is the main image frame and automatically select the optimum layout. Therefore, an album with the excellent layout in design can be easily and speedily created without selecting and laying out the image most appropriate for each of the plurality of image layout frames by the user.

Figure 17:
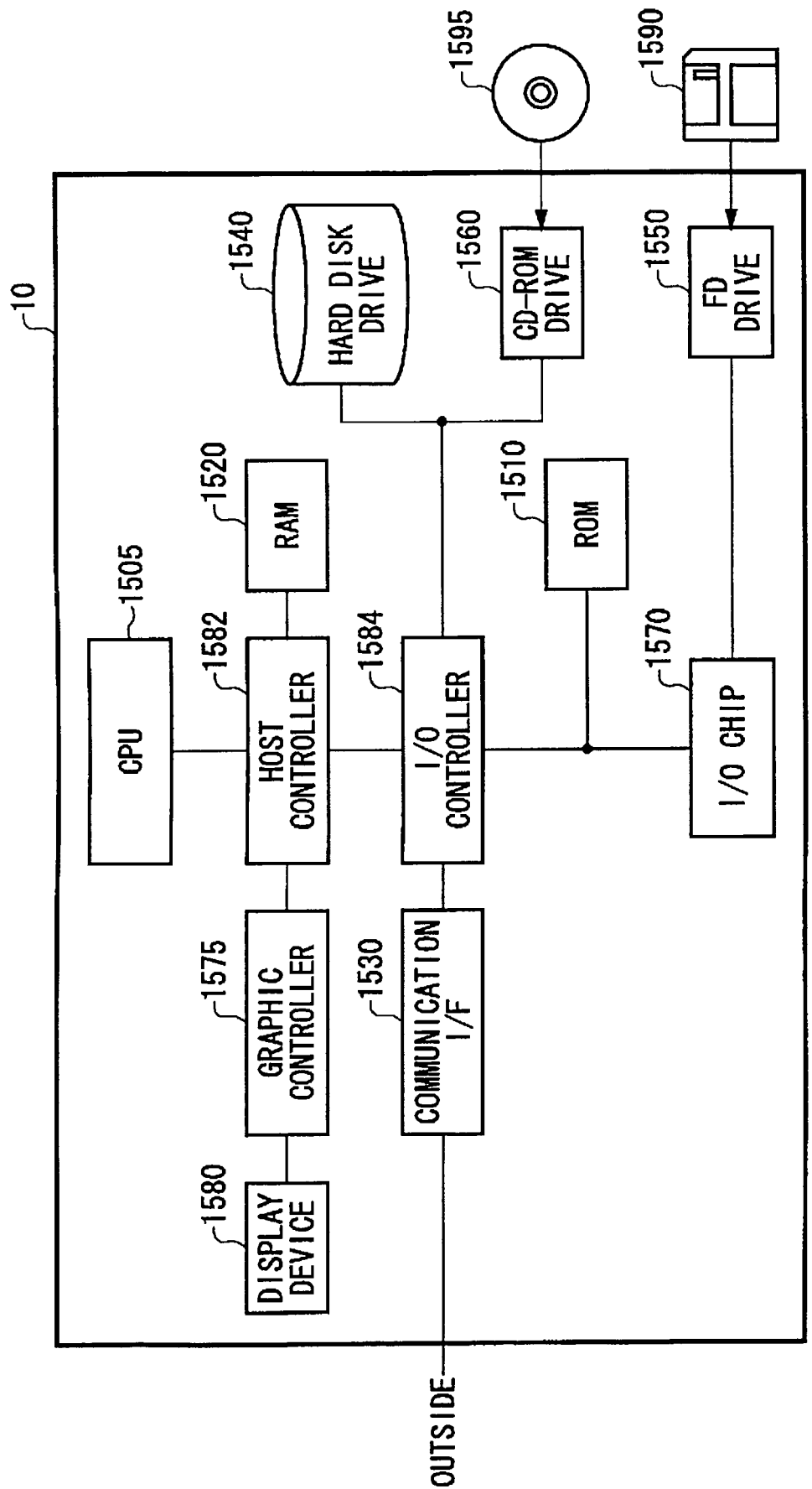
FIG. 17 is a block diagram showing a hardware configuration of the album creating apparatus 10.

FIG. 17 shows an example of the hardware configuration of the album creating apparatus 10. The album creating apparatus 10 includes a CPU periphery having a CPU 1505, a RAM 1520, a graphic controller 1575 and a display 1580 which are connected through a host controller 1582 each other, an input/output unit having a communication interface 1530, a hard disk drive 1540 and a CD-ROM drive 1560 which are connected to the host controller 1582 through an input/output controller 1584 and a legacy input/output unit having a ROM 1510, a flexible disk drive 1550 and an input/output chip 1570 which are connected to the input/output controller 1584.

The host controller 1582 connects the RAM 1520 to the CPU 1505 and the graphic controller 1575 which access the RAM 1520 with a high transfer rate. The CPU 1505 operates according to the programs stored in the ROM 1510 and the RAM 1520 to control each unit. The graphic controller 1575 obtains image data generated on a frame buffer provided in the RAM 1520 by the CPU 1505 and displays the same on the display 1580. Alternatively, the graphic controller 1575 may include therein a frame buffer for storing image data generated by the CPU 1505.

The input/output controller 1584 connects the host controller 1582 to the hard disk drive 1540, the communication interface 1530 and the CD-ROM drive 1560 which are relatively high-speed input/output units. The communication interface 1530 communicates the other units through a network. The hard disk drive 1540 stores the program and data used by the CPU 1505. The hard disk drive stores the program and data used by the CPU 1505 in the album creating apparatus 10. The CD-ROM drive 1560 reads the program or data from the CD-ROM 1595 and provides the same to the hard disk drive 1540 through the RAM 1520.

The ROM 1510, and the flexible disk drive 1550 and input/output chip 1570 which are relatively low-speed input/output units are connected to the input/output controller 1584. The ROM 1510 stores a boot program executed by the album creating apparatus 10 at activating and a program depending on the hardware of the album creating apparatus 10. The flexible disk drive 1550 reads the program or data from a flexible disk 1590 and provides the same to the hard disk drive 1540 through the RAM 1520. The input/output chip 1570 connects various input/output units through the flexible disk drive 1550 and such as a parallel port, a serial port, a keyboard port and a mouse port.

The album creating program provided to the hard disk drive through the RAM 1520 is stored in a recording medium, such as the flexible disk 1590, the CD-ROM 1595, or an IC card and provided by the user. The album creating program is installed in the hard disk drive 1540 in the album creating apparatus 10 and executed by the CPU 1505.

The album creating program installed in the album creating apparatus 10 and executed by the CPU 1505 operates the album creating apparatus 10 to function as the image input section 100, the user instruction receiving section 102, the image selecting section 104, the template selecting section 106, the specified subject information acquiring section 108, the kind of album determining section 110, the condition comparison section 112, the main image frame selecting section 114, the main image selecting section 116, the sub-image selecting section 118, the classification method storage section 120, the sub-image composite information determining section 122, the layout matching calculating section 124, the mage classification section 130, the specified subject image extracting section 132, the trimming section 134, the classification image storage section 135, the main image composite information weight storage section 136, the sub-image composite information weight storage section 138, the template storage section 140, the main image composite information storage section 142, the sub-image composite information storage section 144, the album creating section 150, the character information arrangement section 152, the character type storage section 154, the album output section 155, the template display control section 160, the template candidate display control section 162, the image display control section 164, the use reservation receiving section 170, the edit instruction notifying section 180, the display section 190, the layout display section 192, the template display section 194 and the image display section 196 which are described with reference to FIG. 1-16.

While the present invention has been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

The invention claimed is:

1. An album creating apparatus for creating an album in which a plurality of images are laid out, comprising:
   a classification method storage section for storing a plurality of classification methods for indexing images into one or more groups, each classification method identifying at least one index parameter for grouping images and being associated with one or more album types;
   an image input section for receiving the plurality of images;
   a kind of album determining section for determining an album type using statistical information associated with each of the plurality of received images;
   an image classification section for, after the kind of album determining section determines the album type, selecting one or more of the plurality of stored classification methods based on the determined album type, and classifying each of the plurality of received images into one or more groups using the one or more selected classification methods;
   a template storage section for storing a template in which image layout frames with which the groups into which the images are classified by the image classification section are classified are arranged; and
   an album creating section for laying out in an image layout frame arranged in the template stored in the template storage section the image classified into the group associated with the image layout frame to create an album.

2. The album creating apparatus according to claim 1, wherein
   the template storage section storing the template in which the image layout frames associated with the plurality of groups into which the images are classified based on the different indexes, and
   the album creating section laying out the images classified into the plurality of groups based on the different indexes associated with the image layout frames in the image layout frames arranged in the template stored in the template storage section.

3. The album creating apparatus according to claim 1, wherein
   the template storage section storing the template previously defines that an image classified into a second group should be laid out in a second image layout frame when an image classified into a first group is laid out in a first image layout frame, and that an image classified into a fourth group should be laid out in the second image layout frame when an image classified into a third group is laid out in the first image layout frame, and
   the album creating section laying out the image classified into the second group in the second image layout frame when the image classified into the first group into the first image layout frame in the first image layout frame of the template stored in the template storage section, and the image classified into the fourth group in the second image layout frame when the image classified into the third group into the first image layout frame in the first image layout frame of the template stored in the template storage section to create the album.

4. The album-creating apparatus according to claim 1 further comprising an edit instruction notifying section for notifying a user of an instruction that the image classified into the group associated with an image layout frame in the image layout frame arranged in the template stored in the template storage section,
   the album creating section laying out an image selected by the user according to the instruction notified by the edit instruction notifying section in the image layout frame to create the image.

5. The album creating apparatus according to claim 4, wherein
   the template storage section storing the template which previously defines that an image classified into a second group should be laid out in a second image layout frame when an image classified into a first group is laid out in a first image layout frame, and that an image classified into a fourth group should be laid out in the second image layout frame when an image classified into a third group is laid out in the first image layout frame, and
   the edit instruction notifying section notifying a user of an instruction that an image classified into a second group should be laid out in a second image layout frame when an image classified into a first group is laid out in a first image layout frame of the template stored in the template storage section, and that an image classified into a fourth group should be laid out in the second image layout frame when an image classified into a third group is laid out in the first image layout frame of the template stored in the template storage section.

6. The album creating apparatus according to claim 1, wherein the classification method storage section stores a classification method associated with the album type travel that classifies images based on at least an index being an image capturing place.

7. The album creating apparatus according to claim 1, wherein the classification method storage section stores a classification method associated with the album type wedding that classifies images based on at least an index being a kind of subject.

8. The album creating apparatus according to claim 1, wherein the classification method storage section stores a classification method associated with the album type growth record that classifies images based on at least an index being an image capturing time.

9. An album creating method for creating an album in which a plurality of images are laid out, comprising:

storing a plurality of classification methods for indexing images into one or more groups, each classification method identifying at least one index parameter for grouping images and being associated with one more album types;

receiving the plurality of images from an image input section;

determining an album type using statistical information associated with each of the plurality of received images;

selecting, after determining the album type, one or more of the plurality of stored classification methods based on the determined album type, and classifying each of the plurality of received images into one or more groups using the one or more selected classification methods;

laying out the image classified into the group associated with an image layout frame in the image layout frame with which the group into which the image is classified by the image classifying step is associated, which is arranged in the template stored in a template storage section.

10. A non-transitory computer readable storage medium storing an album creating program for an album creating apparatus for creating an album in which a plurality of images are laid out, the program operates the album creating apparatus to function as:

a classification method storage section for storing a plurality of classification methods for indexing images into one or more groups, each classification method identifying at least one index parameter for grouping images and being associated with one or more album types;

an image input section for receiving the plurality of images;

a kind of album determining section for determining an album type using statistical information associated with each of the plurality of received images;

an image classification section for, after the kind of album determining section determines the album type, selecting one or more of the plurality of stored classification methods based on the determined album type, and classifying each of the plurality of received images into one or more groups using the one or more selected classification methods;

a template storage section for storing a template in which image layout frames with which the groups into which the images are classified by the image classification section are classified are arranged; and an album creating section for laying out in an image layout frame arranged in the template stored in the template storage section the image classified into the group associated with the image layout frame to create an album.

* * * * *